US012694826B2

(12) United States Patent
Wang et al.

(10) Patent No.: US 12,694,826 B2

(45) Date of Patent: Jul. 28, 2026

(54) PIXEL GROUP, ARRAY SUBSTRATE, AND DISPLAY PANEL

(71) Applicant: BOE TECHNOLOGY GROUP CO., LTD., Beijing (CN)

(72) Inventors: Zhichong Wang, Beijing (CN); Jing Feng, Beijing (CN); Peng Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/724,736

(22) PCT Filed: Dec. 30, 2021

(86) PCT No.: PCT/CN2021/143217

§ 371 (c)(1),
(2) Date: Jun. 27, 2024

(87) PCT Pub. No.: WO2023/123237

PCT Pub. Date: Jul. 6, 2023

(65) Prior Publication Data

US 2025/0061860 A1 Feb. 20, 2025

(51) Int. Cl.

*G09G 3/3258* (2016.01)
*G09G 3/3233* (2016.01)

(52) U.S. Cl.

CPC ... *G09G 3/3233* (2013.01); *G09G 2300/0426* (2013.01); *G09G 2300/0804* (2013.01);

(Continued)

(58) Field of Classification Search

CPC ............... G09G 3/3677; G09G 3/3696; G09G 2300/0417; G09G 2300/0426;

(Continued)

(56) References Cited

U.S. PATENT DOCUMENTS

| | | | | |
|---|---|---|---|---|
| 7,427,833 B2 * | 9/2008 | Fish | G09G 3/3233 313/506 |
| 2004/0051685 A1 | 3/2004 | Chung et al. | |

(Continued)

FOREIGN PATENT DOCUMENTS

| | | | |
|---|---|---|---|
| CN | 104318898 A | 1/2015 |
| CN | 106920510 A | 7/2017 |

(Continued)

OTHER PUBLICATIONS

International Search Report of PCT application No. PCT/CN2021/143217 dated Jul. 29, 2022.

(Continued)

*Primary Examiner* — Stacy Khoo

(74) *Attorney, Agent, or Firm* — Calfee, Halter & Griswold LLP

(57) ABSTRACT

A pixel group includes a plurality of pixel circuits and a compensation circuit; where each of the pixel circuits is connected to the compensation circuit; each of the pixel circuits includes a driving transistor; the compensation circuit includes a third transistor; and the compensation circuit is capable of loading a threshold voltage of the third transistor to a control end of the driving transistor; and a channel region of the third transistor has a width to length ratio of a3, a channel region of the driving transistor has a width to length ratio of a1, and a3/a1 is in a range of 1-1.05.

11 Claims, 10 Drawing Sheets

(52) U.S. Cl.
CPC ............... *G09G 2300/0819* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC ....... G09G 2310/0286; G09G 2310/08; G09G 2330/021; H03K 17/161; H03K 3/012
See application file for complete search history.

(56) References Cited

U.S. PATENT DOCUMENTS

| | | | | |
|---|---|---|---|---|
| 2015/0364085 | A1 | 12/2015 | Kanda et al. | |
| 2016/0210896 | A1* | 7/2016 | Gil ..................... | H10K 59/1216 |
| 2021/0020705 | A1* | 1/2021 | He ....................... | H10K 59/353 |

FOREIGN PATENT DOCUMENTS

| | | | | |
|---|---|---|---|---|
| CN | 107170408 | A | 9/2017 | |
| CN | 107633814 | A | 1/2018 | |
| CN | 108281471 | A | 7/2018 | |
| CN | 108806612 | A | 11/2018 | |
| CN | 113707086 | A | 11/2021 | |
| WO | WO-2021104428 | A1 * | 6/2021 | ........... G09G 3/2003 |

OTHER PUBLICATIONS

Written opinion of PCT application No. PCT/CN2021/143217 dated Jul. 29, 2022.

* cited by examiner

PIXEL GROUP, ARRAY SUBSTRATE, AND DISPLAY PANEL

The present application is the U.S. National Stage of International Application No. PCT/CN2021/143217, filed on Dec. 30, 2021, the contents of which are incorporated herein by reference in their entireties for all purposes.

TECHNICAL FIELD

The present disclosure relates to the field of display technologies, and in particular to a pixel group, an array substrate and a display panel.

BACKGROUND

An OLED display device controls a current flowing through a light-emitting device through a driving transistor, thereby achieving a display effect. The driving transistor is affected by its own characteristics and other factors during use, resulting in an offset in its threshold voltage, which in turn affects the current flowing through the light-emitting device, and results in an uneven display.

In the prior art, the above problem is solved by means of internal compensation and external compensation. Typically, however, more space is occupied when the internal compensation is performed, which is not conducive to realization of a high PPI (Pixels Per Inch, pixel density).

The above information disclosed in the background section is only intended to enhance understanding of the background of the present disclosure, and thus it may include information that does not constitute prior art known to those ordinary skilled in the art.

SUMMARY

An object of the present disclosure is to provide a pixel group, an array substrate and a display panel, where the pixel group reduces the space occupied by the compensation circuit in the display area of the display panel, and realizes a high PPI design of the display panel.

To achieve the above invention object, the present disclosure uses technical solutions as follows.

According to a first aspect of the present disclosure, there is provided a pixel group, including a plurality of pixel circuits and a compensation circuit; where each of the pixel circuits is connected to the compensation circuit;

each of the pixel circuits includes a driving transistor;

the compensation circuit includes a third transistor; and the compensation circuit is capable of loading a threshold voltage of the third transistor to a control end of each driving transistor; and a channel region of the third transistor has a width to length ratio of a3, the driving transistor has a width to length ratio of a1, and a3/a1=1-1.05.

In an exemplary embodiment of the present disclosure, the channel region of the third transistor has a same pattern as a channel region of the driving transistor.

In an exemplary embodiment of the present disclosure, each of the pixel circuits further includes:

a data writing circuit, connected to a scanning signal end, a data signal end and a first node, and configured to provide, under control of a scanning signal from the scanning signal end, a data signal from the data signal end to the first node; and a storage capacitor, connected to a third node and the first node, and configured to store a voltage difference between the third node and the first node; where the first node is connected to the control end of the driving transistor, and the driving transistor is configured to output, under control of the first node, a driving current to a light-emitting device; and the compensation circuit is connected to the third node.

In an exemplary embodiment of the present disclosure, the compensation circuit includes:

a second transistor, connected to a compensation switch control signal end, a fourth node and the third node, and configured to conduct the third node and the fourth node under a compensation switch control signal from the compensation switch control signal end; and the third transistor, where a gate and a second electrode of the third transistor are connected to the fourth node, and a first electrode of the third transistor is connected to a first power supply voltage end.

In an exemplary embodiment of the present disclosure, the compensation circuit further includes:

a voltage regulator circuit, connected to the first power supply voltage end and the third node.

In an exemplary embodiment of the present disclosure, the voltage regulator circuit includes a first capacitor, and the first capacitor is connected to the first power supply voltage end and the third node.

In an exemplary embodiment of the present disclosure, the pixel group further includes:

a first reset circuit, connected to a first reset control signal end, a first reset voltage end and the third node, and configured to reset the third node by providing, under control of a first reset control signal from the first reset control signal end, a first reset voltage from the first reset voltage end to the third node.

In an exemplary embodiment of the present disclosure, the driving transistor is connected to the first node, a second node and a fifth node, and the light-emitting device is connected to the fifth node;

the pixel group is connected to a second reset circuit and a light-emitting control circuit;

the second reset circuit is connected to a second reset control signal end, a second reset voltage end and the second node, and is configured to reset the second node by providing, under control of a second reset control signal from the second reset control signal end, a second reset voltage from the second reset voltage end to the second node; and the light-emitting control circuit is connected to a light-emitting control signal end, the first power supply voltage end and the second node, and is configured to provide, under control of a light-emitting control signal from the light-emitting control signal end, a first power supply voltage from the first power supply voltage end to the second node.

In an exemplary embodiment of the present disclosure, a plurality of pixel groups are connected to the same second reset circuit or/and the same light-emitting control circuit.

In an exemplary embodiment of the present disclosure, the data writing circuit includes a fourth transistor, a gate of the fourth transistor is connected to the scanning signal end, a first electrode of the fourth transistor is connected to the data signal end, and a second electrode of the fourth transistor is connected to the first node;

the first reset circuit includes a fifth transistor, where a gate of the fifth transistor is connected to the first reset control signal end, a first electrode of the fifth transistor is connected to the first reset voltage end, and a second electrode of the fifth transistor is connected to the third node;

the second reset circuit includes a sixth transistor, where a gate of the sixth transistor is connected to the second reset control signal end, a first electrode of the sixth transistor is connected to the second reset voltage end, and a second electrode of the sixth transistor is connected to the second node; and the light-emitting control circuit includes a seventh transistor, where a gate of the seventh transistor is connected to the light-emitting control signal end, a first electrode of the seventh transistor is connected to the first power supply voltage end, and a second electrode of the seventh transistor is connected to the second node.

In an exemplary embodiment of the present disclosure, the compensation switch control signal and the light-emitting control signal are the same signal; and the first reset control signal and the second reset control signal are the same signal.

In an exemplary embodiment of the present disclosure, a channel region of the seventh transistor has a width to length ratio of a7, a channel region of the sixth transistor has a width to length ratio of a6, and a7/a6=2.45-2.55.

In an exemplary embodiment of the present disclosure, a channel region of the seventh transistor has a width to length ratio of a7, and a7/a1=5.75-7.05; and a channel region of the sixth transistor has a width to length ratio of a6, and a6/a1=2.25-2.86.

In an exemplary embodiment of the present disclosure, a channel region of the seventh transistor has a greater width to length ratio than the channel region of the driving transistor, a channel region of the second transistor, the channel region of the third transistor, a channel region of the fourth transistor, a channel region of the fifth transistor, and a channel region of the sixth transistor.

According to a second aspect of the present disclosure, there is provided an array substrate, including:

a substrate; and a pixel group, where the pixel group is the pixel group according to the first aspect, and the pixel group is located at a side of the substrate.

In an exemplary embodiment of the present disclosure, in a plurality of pixel groups, at least two of the pixel groups include different numbers of the pixel circuits.

In an exemplary embodiment of the present disclosure, the pixel group includes the plurality of pixel circuits arranged in a plurality of rows and columns; and in the plurality of pixel groups, the pixel groups include a same number of rows of the pixel circuits, and at least two of the pixel groups include different numbers of columns of the pixel circuits.

In an exemplary embodiment of the present disclosure, more than one of the pixel groups are arranged along a row direction to form a row unit, the array substrate includes a plurality of rows of row units; and in the row unit, two adjacent ones of the pixel groups include different numbers of columns of the pixel circuits.

In an exemplary embodiment of the present disclosure, the pixel group includes the plurality of pixel circuits arranged in the plurality of rows and columns, and the compensation circuit is located between any two adjacent rows of the pixel circuits.

According to a third aspect of the present disclosure, there is provided an array substrate, including:

a substrate; and an active semiconductor layer, located at a side of the substrate, and including an active layer of at least one pixel group, where the pixel group is the pixel group according to the first aspect, the active semiconductor layer includes a plurality of first semiconductor portion groups and a second semiconductor portion located between any two adjacent ones of the first semiconductor portion groups; where the first semiconductor portion group includes a second semiconductor portion sub-group, where the second semiconductor portion sub-group includes a plurality of second semiconductor sub-portions, and the second semiconductor sub-portion includes an active layer of the driving transistor; and the second semiconductor portion includes an active layer of the third transistor.

In an exemplary embodiment of the present disclosure, the first semiconductor portion group further includes an active layer of the fourth transistor;

the second semiconductor portion further includes an active layer of the second transistor, and an active layer of the fifth transistor; and the active layer of the third transistor, the active layer of the second transistor, and the active layer of the fifth transistor are sequentially arranged along a row direction.

In an exemplary embodiment of the present disclosure, the array substrate further includes:

a first conductive layer, located at a side of the active semiconductor layer away from the substrate; where the first conductive layer includes a first plate of the storage capacitor and a first plate of a first capacitor, where the first plate of the first capacitor has a greater length in the row direction than in a column direction.

In an exemplary embodiment of the present disclosure, the array substrate further includes:

a second conductive layer, located at a side of the first conductive layer away from the substrate, where the second conductive layer includes second plates of a plurality of storage capacitors, and the second plates of the plurality of storage capacitors included in a single pixel group form an integrated structure.

In an exemplary embodiment of the present disclosure, the array substrate further includes a first power supply voltage line extending along the row direction; where the first power supply voltage line is connected to the first plate of the first capacitor; and a second electrode region of the active layer of the second transistor is electrically connected to the second plate of the storage capacitor, and the second plate of the storage capacitor is electrically connected to a second plate of the first capacitor.

In an exemplary embodiment of the present disclosure, the second electrode region of the second transistor is electrically connected to the second plate of the storage capacitor via a first adapter portion;

the second plate of the storage capacitor is electrically connected to the second plate of the first capacitor via a second adapter portion; and the first adapter portion and the second adapter portion are provided in a same layer.

In an exemplary embodiment of the present disclosure, the first adapter portion and the second adapter portion extend along the column direction;

the array substrate further includes a reset voltage line extending along the row direction, where the reset voltage line and the first power supply voltage line are provided in a same layer, and orthographic projections, on the substrate, of the reset voltage line and the first power supply voltage line are located between orthographic projections, on the substrate, of two adjacent rows of the second plates of the storage capacitors;

an orthographic projection of the first adapter portion on the substrate is at least partially overlapped with the orthographic projections, on the substrate, of the reset voltage line and the first power supply voltage line; and an orthographic projection of the second adapter portion on the substrate is at least partially overlapped with the orthographic projections, on the substrate, of the reset voltage line and the first power supply voltage line.

In an exemplary embodiment of the present disclosure, the first power supply voltage line and the reset voltage line are distributed in the second conductive layer; and the array substrate further includes:

a third conductive layer, located at a side of the second conductive layer away from the substrate; where the first adapter portion and the second adapter portion are distributed in the third conductive layer.

In an exemplary embodiment of the present disclosure, the first adapter portion and the second adapter portion are distributed in the second conductive layer, and the second adapter portion and the second plate of the first capacitor form an integrated structure; and the array substrate further includes:

a third conductive layer, located at a side of the second conductive layer away from the substrate, where the first power supply voltage line and the reset voltage line are distributed in the third conductive layer.

In an exemplary embodiment of the present disclosure, the first adapter portion and the first power supply voltage line are provided in different layers.

In an exemplary embodiment of the present disclosure, the array substrate further includes:

a fourth conductive layer, located at a side of the third conductive layer away from the substrate, where the fourth conductive layer includes a plurality of data signal lines extending along the column direction.

In an exemplary embodiment of the present disclosure, in two adjacent pixel groups, the second plates of the plurality of storage capacitors included in one of the pixel groups are separated from and disconnected with the second plates of the plurality of storage capacitors included in another one of the pixel groups.

In an exemplary embodiment of the present disclosure, the substrate includes a display area and a non-display area located at a periphery of the display area; and orthographic projections, on the substrate, of the driving transistor, the second transistor, the third transistor, the fourth transistor, and the fifth transistor are located in the display area; and orthographic projections, on the substrate, of the sixth transistor and the seventh transistor are located in the non-display area.

According to a fourth aspect of the present disclosure, there is provided a display panel, including the array substrate according to the second aspect.

In the pixel group provided by the present disclosure, a plurality of pixel circuits share one compensation circuit, each of the pixel circuits is connected to the compensation circuit, and internal compensation is uniformly performed for the driving transistors T1 of the plurality of pixel circuits 10 by loading the threshold voltage of the third transistor T3 to the control ends G of the driving transistors T1, thereby reducing the space occupied by the compensation circuit in the display area of the display panel, which facilitates the realization of the high PPI (Pixels Per Inch, pixel density) design of the display panel.

BRIEF DESCRIPTION OF THE DRAWINGS

The foregoing and other features and advantages of the present disclosure will become more apparent by describing the exemplary embodiments thereof in detail with reference to the accompanying drawings.

Figure 1:
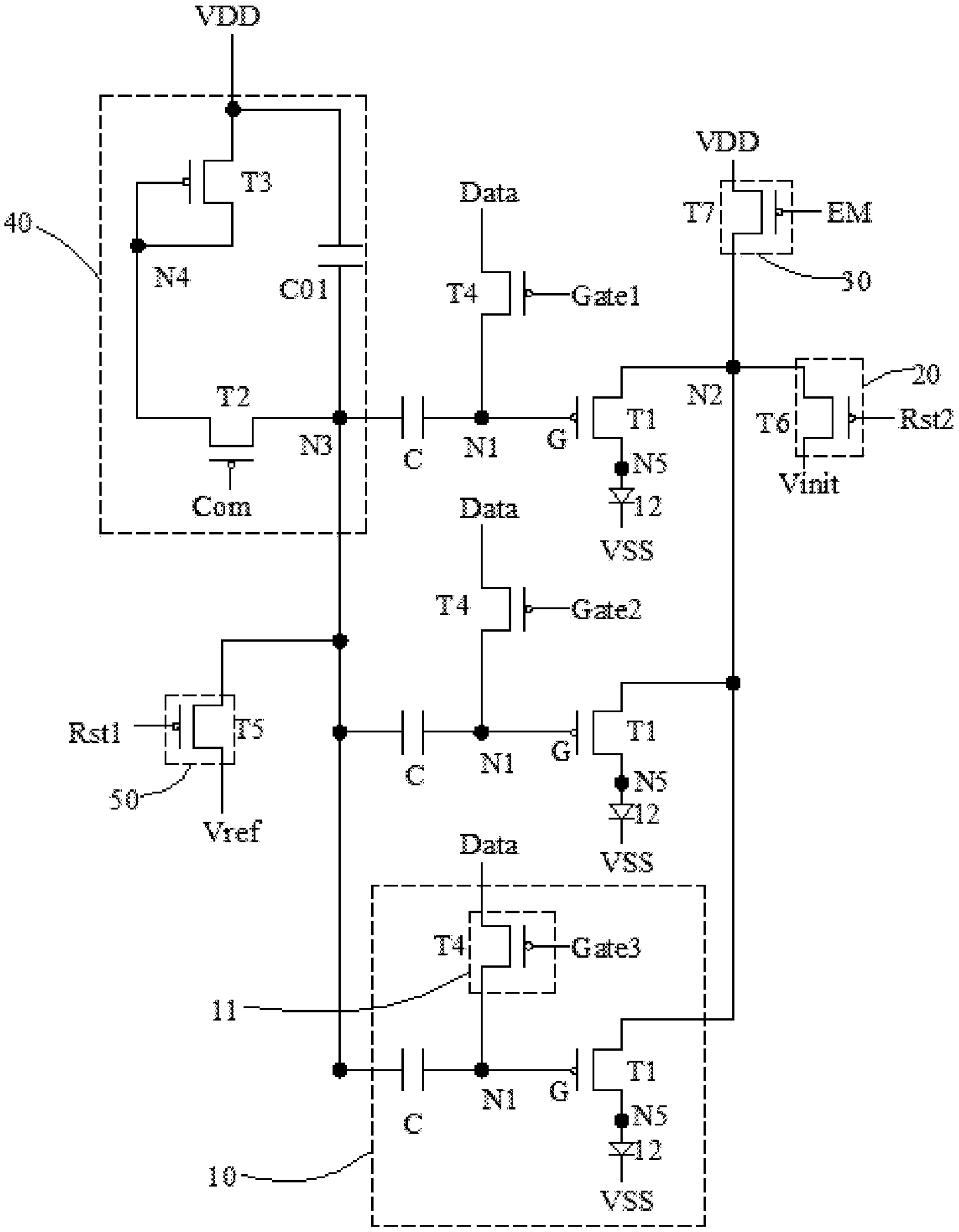
FIG. 1 is a pixel group equivalent circuit diagram in an exemplary embodiment of the present disclosure.

Reference numerals of main components in the figures are illustrated as follows.

01—row unit; 1—pixel group; 10—pixel circuit; T1—driving transistor; N1—first node; N2—second node; N5—fifth node; 11—data writing circuit; Gate—scanning signal end; Data—data signal end; T4—fourth transistor; C—storage capacitor; 12—light-emitting device; VSS—second power supply voltage end; 20—second reset circuit; Rst2—second reset control signal end; Vinit—second reset voltage end; T6—sixth transistor; 30—light-emitting control circuit; EM—light-emitting control signal end; VDD—first power supply voltage end; T7—seventh transistor; 40—compensation circuit; T2—second transistor; Com—compensation switch control signal end; N4—fourth node; N3—third node; T3—third transistor; C1—first capacitor; 50—first reset circuit; Rst1—first reset control signal end; Vref—first reset voltage end; T5—fifth transistor;

100—active semiconductor layer; 110—first semiconductor portion group; 111—first semiconductor sub-portion; 112—second semiconductor sub-portion; 120—second semiconductor portion; 130—third semiconductor portion;

200—first conductive layer; 210—first conductive portion group; GAL—scanning signal line; 220—second conductive portion group; 221—third conductive sub-portion; 222—fourth conductive sub-portion; 230—eighth conductive portion group;

300—second conductive layer; 310—third conductive portion group; 311—first connection portion; C2—second plate of storage capacitor; 312—eighth connection portion; 320—fourth conductive portion group; VDDL—first power supply voltage line; COL—compensation switch control signal line; EML—light-emitting control signal line; 321—fifth conductive portion sub-group; C12—second plate of first capacitor; 3211—second connection portion; VINL—reset voltage line; RSTL—reset control signal line; C11—first plate of first capacitor; C1—first plate of storage capacitor;

400—third conductive layer; 410—fifth conductive portion group; 411—fifth conductive portion; 420—sixth conductive portion group; 421—third connection portion; 422—fourth connection portion; 430—ninth conductive portion group;

500—fourth conductive layer; 510—seventh conductive portion group; 511—fifth connection portion; 5110—sub-region; DAL—data signal line;

600—fifth conductive layer; 610—anode;

300'—second conductive layer; 310'—third conductive portion group; 311'—first connection portion; C2'—second plate of storage capacitor; 312'—eighth connection portion; 320'—fourth conductive portion group; C12'—second plate of first capacitor; 321'—sixth connection portion; 322'—seventh connection portion; 400—third conductive layer; 410'—fifth conductive portion group; 411'—fifth conductive portion; 420'—sixth conductive portion group; VDDL'—first power supply voltage line; EML'—compensation switch control signal line; VINIL'—reset voltage line; RSTL'—reset control signal line;

P1—data writing stage; P2—light-emitting stage; AA—display area; FA—non-display area.

DETAILED DESCRIPTION

The exemplary embodiments are now described more comprehensively with reference to the accompanying drawings. However, the exemplary embodiments are capable of being implemented in a variety of forms and should not be construed as being limited to the examples set forth herein. Rather, the provision of these embodiments allows for the present disclosure to be more comprehensive and complete, and conveys the idea of the exemplary embodiments in a comprehensive manner to those skilled in the art. The described features, structures or characteristics may be combined in one or more embodiments in any suitable manner. In the following description, many specific details are provided, thereby giving a full understanding of the embodiments of the present disclosure.

In the figures, areas and thicknesses of layers may be exaggerated for clarity. The same reference numerals in the figures indicate the same or similar structures, and thus their detailed descriptions will be omitted.

The described features, structures or characteristics may be combined in one or more embodiments in any suitable manner. In the following description, many specific details are provided, thereby giving a full understanding of the embodiments of the present disclosure. However, those skilled in the art will realize that it is possible to practice the technical solutions of the present disclosure without one or more of the described particular details, or that other methods, components, materials, etc. may be used. In other cases, the well-known structures, materials or operations are not shown or described in detail to avoid obscuring the main technical ideas of the present disclosure.

When a certain structure is “on” another structure, it may mean that the certain structure is integrally formed on another structure, or that the certain structure is “directly” provided on another structure, or that the certain structure is “indirectly” provided on another structure through yet another structure.

The terms “a”, “an” and “the” are used for indicating an existence of one or more elements/components/etc.; and the terms “include” and “have” are used for indicating an open-ended inclusion and mean that there may be additional elements/components/etc. in addition to the listed elements/components/etc. The terms “first” and “second”, etc. are used merely as markers and not as quantitative limitations to the objects thereof.

In the related art, when internal compensation is performed in the display device, each pixel circuit may be configured with one compensation circuit. This setting method occupies a large amount of space and is not conducive to the realization of the high PPI.

Figure 2:
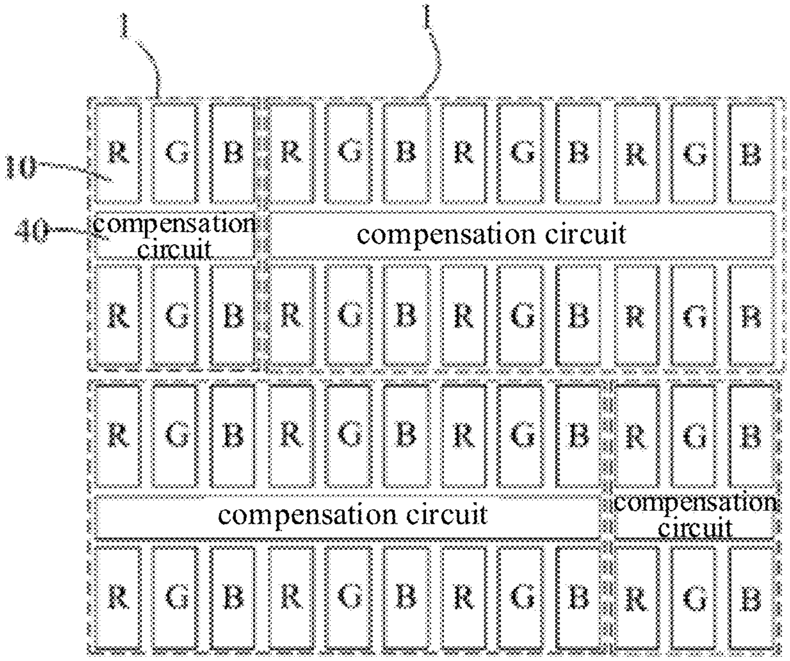
FIG. 2 is a schematic structural diagram of a pixel group included in an array substrate in an exemplary embodiment of the present disclosure.

As shown in FIGS. 1 and 2, an embodiment of the present disclosure provides a pixel group 1, including a plurality of pixel circuits 10 and a compensation circuit 40; each of the pixel circuits 10 is connected to the compensation circuit 40, each of the pixel circuits 10 includes a driving transistor T1, the compensation circuit 40 is capable of loading a threshold voltage of a third transistor T3 to a control end G of each driving transistor T1, a channel region of the third transistor T3 has a width to length ratio of a3, a channel region of the driving transistor T1 has a width to length ratio of a1, and a3/a1=1-1.05.

In the pixel group 1 provided by the present disclosure, a plurality of pixel circuits 10 share one compensation circuit 40, each of the pixel circuits 10 is connected to the compensation circuit 40, and internal compensation is uniformly performed for the driving transistors T1 of the plurality of pixel circuits 10 by loading the threshold voltage of the third transistor T3 to the control ends G of the driving transistors T1, thereby reducing the space occupied by the compensation circuit 40 in the display area AA of the display panel, which facilitates the realization of the high PPI (Pixels Per Inch, pixel density) design of the display panel.

The components of the pixel group 1 provided by the embodiment of the present disclosure are described in detail below in conjunction with the accompanying drawings.

As shown in FIGS. 1 and 2, the present disclosure provides a pixel group 1 located in the display area AA of the display panel, and the display panel may be an OLED display panel. The pixel group 1 enables the realization of internal compensation for a plurality of pixel circuits 10 simultaneously.

It should be noted herein that, in the present disclosure, the connections in the pixel group 1 refer to electrical connections. Electrical signals may be transmitted between the components that are connected to each other.

The pixel group 1 includes a plurality of pixel circuits 10 and one compensation circuit 40, each of the pixel circuits 10 is connected to the compensation circuit 40, each of the pixel circuits 10 includes the driving transistor T1, and the compensation circuit 40 is capable of compensating the threshold voltage of the driving transistor T1. The channel region of the third transistor T3 has a width to length ratio of a3, the channel region of the driving transistor T1 has a width to length ratio of a1, and a3/a1=1-1.05.

It should be noted herein that the channel region is a region where the active layer of the transistor is covered by the gate. The channel region of the third transistor T3 means the region where the active layer of the third transistor T3 is covered by the gate of the third transistor T3, and similarly, the channel region of the driving transistor T1 means the region where the active layer of the driving transistor T1 is covered by the gate of the driving transistor T1.

In the present disclosure, the width to length ratio of the channel region of the third transistor T3 is substantially equal to the width to length ratio of the channel region of the driving transistor T1, which allows the threshold voltage of the third transistor T3 to be substantially equal to the threshold voltage of the driving transistor T1, so that the threshold voltage of the third transistor T3 can be used to compensate the threshold voltage of the driving transistor T1.

In some embodiments of the present disclosure, the pattern of the channel region of the third transistor T3 is the same as the pattern of the channel region of the driving transistor T1. It should be noted herein that the pattern being the same herein means being substantially the same within the range of process errors.

The plurality of pixel circuits 10 may be arranged in an array along a row direction and a column direction. In some embodiments of the present disclosure, the pixel circuit 10 includes the driving transistor T1, a data writing circuit 11 and a storage capacitor C.

The data writing circuit 11 is connected to a scanning signal end Gate, a data signal end Data, and a first node N1, and is configured to provide, under control of a scanning signal from the scanning signal end Gate, a data signal from the data signal end Data to the first node N1.

The first node N1 is connected to the control end G of the driving transistor T1, and the driving transistor T1 is configured to output, under control of the first node N1, a driving current to a light-emitting device 12.

The storage capacitor C is connected to a third node N3 and the first node N1, and is configured to store a voltage difference between the third node N3 and the first node N1. The compensation circuit 40 is connected to the third node N3, and is capable of compensating the threshold voltage of the driving transistor T1.

In some embodiments of the present disclosure, the pixel group 1 further includes a first reset circuit 50 that is connected to a first reset control signal end Rst1, a first reset voltage end Vref, and the third node N3, and is configured to reset the third node N3 by providing, under control of a first reset control signal from the first reset control signal end Rst1, a first reset voltage from the first reset voltage end Vref to the third node N3. More than one of the pixel circuits 10 may share one first reset circuit 50. For example, all pixel circuits 10 in one pixel group 1 share one first reset circuit 50.

In some embodiments of the present disclosure, the driving transistor T1 is connected to the first node N1, a second node N2, and a fifth node N5, and the light-emitting device 12 is connected to the fifth node N5 and a second power supply voltage end VSS. The light-emitting device 12 may be a light-emitting diode or the like. The light-emitting diode may be an organic light-emitting diode (OLED), or a quantum dot light-emitting diode (QLED), etc.

The pixel group 1 is connected to a second reset circuit 20 and a light-emitting control circuit 30. In some embodiments of the present disclosure, a plurality of pixel groups 1 may be connected to the same light-emitting control circuit 30 or/and the same second reset circuit 20, i.e., a plurality of pixel groups 1 may share one second reset circuit 20 or one light-emitting control circuit 30, or may share one second reset circuit 20 and one light-emitting control circuit 30 at the same time.

The second reset circuit 20 is connected to a second reset control signal end Rst2, a second reset voltage end Vinit, and the second node N2, and is configured to reset the second node N2 by providing, under control of a second reset control signal from the second reset control signal end Rst2, a second reset voltage from the second reset voltage end Vinit to the second node N2.

The light-emitting control circuit 30 is connected to a light-emitting control signal end EM, the first power supply voltage end VDD, and the second node N2, and is configured to provide, under control of a light-emitting control signal from the light-emitting control signal end EM, a first power supply voltage from the first power supply voltage end VDD to the second node N2.

In some embodiments of the present disclosure, the compensation circuit 40 includes a second transistor T2 and the third transistor T3. In some embodiments, the second transistor T2 is connected to a compensation switch control signal end Com, a fourth node N4, and the third node N3, and is configured to conduct the third node N3 and the fourth node N4 under a compensation switch control signal from the compensation switch control signal end Com. A gate and a second electrode of the third transistor T3 are connected to the fourth node N4, and a first electrode of the third transistor T3 is connected to the first power supply voltage end VDD.

Furthermore, the compensation circuit 40 further includes a voltage regulator circuit, and the voltage regulator circuit is connected to the first power supply voltage end and the third node. Specifically, the voltage regulator circuit may include a first capacitor C01, and the first capacitor C01 is connected to the first power supply voltage end VDD and the third node N3.

In some embodiments of the present disclosure, the data writing circuit 11 includes a fourth transistor T4, the first reset circuit 50 includes a fifth transistor T5, the second reset circuit 20 includes a sixth transistor T6, and the light-emitting control circuit 30 includes a seventh transistor T7.

A gate of the fourth transistor T4 is connected to the scanning signal end Gate, a first electrode of the fourth transistor T4 is connected to the data signal end Data, and a second electrode of the fourth transistor T4 is connected to the first node N1.

A gate of the fifth transistor T5 is connected to the first reset control signal end Rst1, a first electrode of the fifth transistor T5 is connected to the first reset voltage end Vref, and a second electrode of the fifth transistor T5 is connected to the third node N3.

A gate of the sixth transistor T6 is connected to the second reset control signal end Rst2, a first electrode of the sixth transistor T6 is connected to the second reset voltage end Vinit, and a second electrode of the sixth transistor T6 is connected to the second node N2.

A gate of the seventh transistor T7 is connected to the light-emitting control signal end EM, a first electrode of the seventh transistor T7 is connected to the first power supply voltage end VDD, and a second electrode of the seventh transistor T7 is connected to the second node N2.

In some embodiments of the present disclosure, the compensation switch control signal and the light-emitting control signal are the same signal; and the first reset control signal and the second reset control signal are the same signal.

In some embodiments of the present disclosure, the driving transistor T1, the second transistor T2, the third transistor T3, the fourth transistor T4, the fifth transistor T5, the sixth transistor T6, and the seventh transistor T7 are P-type transistors.

In addition, it should be noted that the transistors used in the embodiments of the present disclosure may also be N-type transistors, and it is only required to connect the electrodes of the selected type of transistors accordingly with reference to the electrodes of the corresponding transistors in the embodiments of the present disclosure, and to cause the corresponding voltage ends to provide the corresponding high voltages or low voltages. For example, for the N-type transistor, the input end thereof is the drain end, the output end thereof is the source end, and the control end thereof is the gate end; for the P-type transistor, the input end thereof is the source end, the output end thereof is the drain end, and the control end thereof is the gate end. For different types of transistors, levels of control signals of control ends of different types of transistors are also different. For example, for the N-type transistor, when the control signal is the high level, the N-type transistor is in the on state; and when the control signal is the low level, the N-type transistor is in the cut-off state. For the P-type transistor, when the control signal is the low level, the P-type transistor is in the on state; and when the control signal is the high level, the P-type transistor is in the cut-off state.

Figure 4:
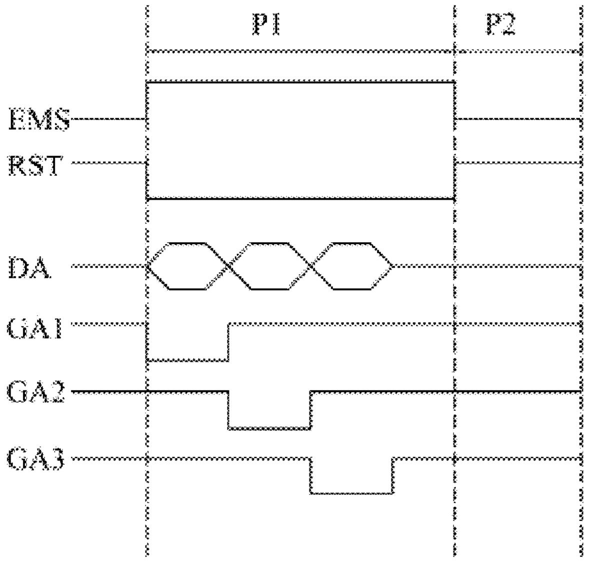
FIG. 4 is a timing diagram of signals driving the circuit in FIG. 1.

FIG. 4 is a timing diagram for driving the pixel group 1 in FIG. 1. The working process of the pixel group 1 in FIG. 1 includes two phases, namely a data writing phase P1 and a light-emitting phase P2. In FIG. 1, three pixel circuits 10 are included, and the three pixel circuits 10 are located in different rows. The scanning signal ends Gate corresponding to the three pixel circuits 10 are Gate1, Gate2 and Gate3 respectively; the compensation switch control signal and the light-emitting control signal are the same signal, i.e., the light-emitting control signal EMS; and the first reset control signal and the second reset control signal are the same signal, i.e., the reset control signal RST.

At the data writing phase P1, the light-emitting control signal end EM and the compensation switch control signal end Com output the high level signal EMS, the first reset control signal end Rst1 and the second reset control signal end Rst2 output the low level signal RST, and the scanning signal ends Gate of the three pixel circuits 10 output low level signals GA1, GA2 and GA3 in sequence row by row; and the data signal ends Data of the three pixel circuits 10 output data signals DA.

At the data writing phase P1, the fifth transistor T5 is on, the first reset voltage end Vref applies the first reset voltage Vre to the third node N3, and to the first plates of the storage capacitors C of the three pixel circuits 10 at the same time; the sixth transistor T6 is on, the driving transistor T1 is cut-off, and the second reset voltage end Vinit resets the second node N2 by applying the second reset voltage Vin to the second node N2, thereby avoiding the influence on the other rows of pixel circuits 10 due to the voltage fluctuation of the second node N2 when the data signals DA is written to the corresponding pixel circuits 10 row by row; the fourth transistors T4 of the three pixel circuits 10 are on in sequence row by row, and the data signal ends Data writes the data signals DA to the first nodes N1 of the corresponding pixel circuits 10 row by row.

At the data writing phase P1, the second transistor T2 and the seventh transistor T7 are cut-off.

It can be understood that at the data writing phase P1, the fifth transistor T5 is on, the voltage of the third node N3 is Vre, the fourth transistor T4 is on, the voltage of the first node N1 is Vda, and the voltage difference between the first node N1 and the third node N3 is Vda-Vre.

At the light-emitting phase P2, the light-emitting control signal end EM and the compensation switch control signal end Com output the low level signal EMS, the first reset control signal end Rst1 and the second reset control signal end Rst2 output the high level signal RST, and the scanning signal ends Gate of the three pixel circuits 10 output high level signals GA1, GA2 and GA3.

At the light-emitting phase P2, the seventh transistor T7 is on, the first power supply voltage end VDD outputs the first power supply voltage and applies it to the second node N2; the second transistor T2 is on, the voltage of the third node N3 is applied to the fourth node N4, the third transistor T3 is on, the first power supply voltage end VDD charges the storage capacitors C of the three pixel circuits 10 by outputting the first power supply voltage which passes through the third transistor T3 and the second transistor T2, that is, charging the first nodes N1 (the control end G of the driving transistor T1) of the three pixel circuits 10, and thus the voltages of the first nodes N1 (the control end G of the driving transistor T1) gradually increase.

At the light-emitting phase P2, the sixth transistor T6, the fifth transistor T5, and the fourth transistors T4 of the three pixel circuits 10 are cut-off.

It can be understood that at the light-emitting phase P2, the seventh transistor T7 is on, and the voltage of the second node N2 is Vdd; the second transistor T2 is on, the initial voltage of the fourth node N4 is Vre, the third transistor T3 is on, and the voltage of the fourth node N4 begins to increase; according to the characteristic of the third transistor T3 itself, when the voltage of the fourth node N4 increases to Vdd+Vth0, the third transistor T3 is cut-off, where Vdd indicates the first power supply voltage, and Vth0 indicates the threshold voltage of the third transistor T3. Since the second transistor T2 is on, the voltage of the third node N3 increases gradually with the voltage of the fourth node N4, and is finally Vdd+Vth0. Since the voltage difference between the first node N1 and the third node N3 is Vda−Vre, the voltage of the first node N1 increases to Vdd+Vth0+Vda−Vre. The driving transistor T1 emits light under the action of the voltage Vdd+Vth0+Vda−Vre. According to the driving transistor T1 output current formula I=(μWCox/2L)(Vgs−Vth)2, where u is the carrier mobility, Cox is the gate capacitance per unit area, W is the width of the channel of the driving transistor T1, L is the length of the channel of the driving transistor T1, Vgs is the gate source voltage difference of the driving transistor T1, and Vth is the threshold voltage of the driving transistor T1, the output current I of the driving transistor T1 in the pixel circuit 10 of the present disclosure is: I=(μWCox/2L)(Vdd+Vth0+Vda−Vref−Vdd−Vth)2. In the present disclosure, the threshold voltage of the third transistor T3 and the threshold voltage of the driving transistor T1 are equal, i.e., Vth0=Vth. Therefore, the output current I of the driving transistor T1 in the pixel circuit 10 of the present disclosure is I=(μWCox/2L)(Vda−Vref)2, which can avoid the influence of the threshold value of the driving transistor T1 on its output current.

In some embodiments of the present disclosure, the channel region of the seventh transistor T7 has a width to length ratio of a7, the channel region of the driving transistor T1 has a width to length ratio of a1, and a7/a1=5.75-7.05, which may specifically be 5.83, 6, 6.85, or 6.9, but is not limited to this, and may specifically be any value in the range of 5.75-7.05. In some embodiments, the width to length ratio of the channel region of the seventh transistor T7 is a7=0.95-1.05, and the width to length ratio of the channel region of the driving transistor T1 is a1=0.145-0.175. For example, the width to length ratio of the channel region of the seventh transistor T7 is a7=5/5=1, and the width to length ratio of the channel region of the driving transistor T1 is a1=2/12, 2/13.7, 2/13.3, or 1.5/8.75, etc., but is not limited to this.

The channel region of the sixth transistor T6 has a width to length ratio of a6, the channel region of the driving transistor T1 has a width to length ratio of a6, and a6/a1=2.25-2.86, which may specifically be 2.33, 2.4, 2.74, or 2.76, but is not limited to this, and may be any value in the range of 2.25-2.86. In some embodiments, the sixth transistor T6 has a width to length ratio of a6=0.35-0.45. For example, the width to length ratio of the channel region of the sixth transistor T6 is a6=2/5-0.4.

In the present disclosure, the width to length ratios of the channel regions of the sixth transistor T6 and the seventh transistor T7 are larger than the width to length ratio of the channel region of the driving transistor T1. This structural design facilitates providing the sixth transistor T6 and the seventh transistor T7 with sufficient current to drive a plurality of pixel groups 1.

Furthermore, the channel region of the seventh transistor T7 has a width to length ratio of a7, the channel region of the sixth transistor T6 has a width to length ratio of a6, and a7/a6=2.45-2.55, which may specifically be 2.45, 2.5 or 2.55, but is not limited to this, and may specifically be any value in the range of 2.45-2.55.

In some embodiments of the present disclosure, all of the width to length ratio a1 of the channel region of the driving transistor T1, the width to length ratio a2 of the channel region of the second transistor T2, the width to length ratio a3 of the channel region of the third transistor T3, the width to length ratio a4 of the channel region of the fourth transistor T4, the width to length ratio a5 of the channel region of the fifth transistor T5, and the width to length ratio a6 of the channel region of the sixth transistor T6 are smaller than the width to length ratio a7 of the channel region of the seventh transistor T7.

Specifically, the width to length ratio of the channel region of the second transistor T2 is a2=0.75-0.85, e.g., a2=2/2.5=0.8, but is not limited thereto; the width to length ratio a3 of the channel region of the third transistor is substantially equal to the width to length ratio of the channel region of the driving transistor T1, where a3=0.145-0.175, e.g., a3=2/12, 2/13.7, 2/13.3, or 1.5/8.75, etc., but is not limited thereto; the width to length ratio of the channel region of the fourth transistor T4 is a4=0.75-0.85, e.g., a4=2/2.5=0.8, but is not limited thereto; and the width to length ratio of the channel region of the fifth transistor T5 is a5=0.35-0.45, e.g., a5=2/5=0.4, but is not limited thereto. The width to length ratio a6 of the channel region of the sixth transistor T6 and the width to length ratio a7 of the channel region of the seventh transistor T7 can refer to the above description, and will not be repeated in detail herein.

Figure 3:
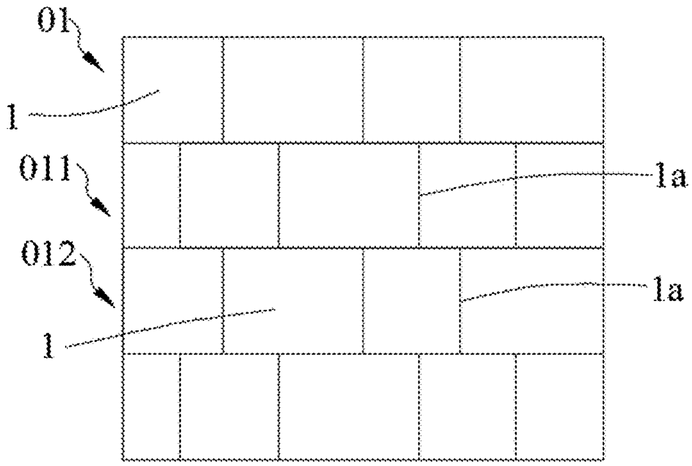
FIG. 3 is a schematic diagram of an arrangement mode of a pixel group included in an array substrate in an exemplary embodiment of the present disclosure.

As shown in FIGS. 2 and 3, the present disclosure also provides an array substrate including a substrate and a plurality of pixel groups 1 as described above, where the plurality of pixel groups 1 are located at a side of the substrate.

Each pixel group 1 in the plurality of pixel groups 1 includes a plurality of pixel circuits 10 and one compensation circuit 40, the numbers of pixel circuits 10 in the pixel groups 1 may be the same or different, and at least two of the pixel groups include different numbers of the pixel circuits 10. For example, the number of pixel circuits 10 in one pixel group 1 is 6, and the number of pixel circuits 10 in another pixel group 1 is 6 or 9, or some other greater numbers. Including different numbers of pixel circuits 10 in the pixel groups 1 is conducive to reducing the risk of uneven display brightness of the display panel.

The plurality of pixel circuits 10 in each of the pixel groups 1 are arranged in an array, i.e., each pixel group 1 includes the plurality of pixel circuits 10 arranged in a plurality of rows and columns. In some embodiments of the present disclosure, the pixel groups 1 include the same number of rows of the pixel circuits 10, the same number of columns or different numbers of columns of the pixel circuits 10, and at least two of the pixel groups 1 include different numbers of columns of the pixel circuits 10.

In some embodiments of the present disclosure, more than one of the pixel groups 1 are arranged along the row direction to form a row unit 01, the array substrate includes a plurality of rows of row units 01, and separating lines 1*a* between two adjacent pixel groups 1 are staggered in two adjacent rows of the row units 01. In the present disclosure, the separating line 1*a* between two adjacent pixel groups 1 refers to a dividing line between the two adjacent pixel groups 1, and the two pixel groups are located at different sides of the dividing line. For example, the separating line 1*a* of the row unit 011 and the separating line 1*a* of the row unit 012 adjacent to the row unit 011 are staggered. This structural design, while reducing the process difficulty, is conducive to reducing the risk of uneven display brightness of the display panel. Furthermore, in the row unit 01, the numbers of columns of the pixel circuits 10 included in two adjacent pixel groups 1 are different. For example, in two pixel groups 1, one of the two pixel groups 1 includes two rows and three columns of pixel circuits 10, that is, including six pixel circuits 10, and the other one of the two pixel groups 1 includes two rows and nine columns of pixel circuits 10, that is, including 18 pixel circuits 10. In the present disclosure, the arrangement of the pixel groups 1 is conducive to reducing the brightness difference between the pixel groups 01, blurring the display boundary between pixel groups 1 adjacent to each other, and thus reducing the mura risk of the display panel.

The substrate includes a display area AA and a non-display area FA located at a periphery of the display area AA, and an orthographic projection of the pixel group 1 on the substrate is located in the display area AA. The display area AA is used for displaying an image. The light-emitting control circuit 30 and the second reset circuit 20 to which the plurality of pixel groups 1 are connected are also located at a side of the substrate, and orthographic projections, on the substrate, of the light-emitting control circuit 30 and the second reset circuit 20 are located in the non-display area FA. Specifically, the orthographic projections, on the substrate, of the light-emitting control circuit 30 and the second reset circuit 20 may be located at two sides of the display area AA, or may be located at only one side of the display area AA, the specifics of which are not limited in the present disclosure. Preferably, to ensure the driving effect, the light-emitting control circuit 30 and the second reset circuit 20 are located at two sides of the display area AA. The array substrate may further include a gate driving circuit, and an orthographic projection of the gate driving circuit on the substrate is located in the non-display area FA. The light-emitting control circuit 30 and the second reset circuit 20 are located at a side of the gate driving circuit close to the display area AA.

The plurality of pixel groups 1 may share one light-emitting control circuit 30 and one second reset circuit 20. For example, the plurality of rows of row units 01 may be jointly connected to one light-emitting control circuit 30 and one second reset circuit 20, i.e., the plurality of rows of pixel groups 1 share one light-emitting control circuit 30 and one second reset circuit 20; of course, it is also possible that each row of row units 01 is connected to one light-emitting control circuit 30 and one second reset circuit 20, or that some of the pixel groups 1 in each row of row units 01 are connected to one light-emitting control circuit 30 and one second reset circuit 20, and the remaining pixel groups 1 in that row of row units 01 are connected to another light-emitting control circuit 30 and another second reset circuit 20, the specifics of which are not limited in the present disclosure.

In the present disclosure, the plurality of pixel groups 1 share one light-emitting control circuit 30 and one second reset circuit 20, which is conducive to reducing the size of a single pixel group 1, i.e., reducing the size of each pixel circuit 10 in the pixel group 1, thereby helping to increase the PPI of the display panel and achieve a high PPI design effect.

Next, pattern structures of respective film layers of the pixel circuit 10, the compensation circuit 40 and the first reset circuit 50 that are included in the array substrate are illustrated by using a certain pixel group 1 as an example. In addition, to more clearly illustrate the structural design of the array substrate in the present disclosure, pattern structures of respective film layers of the second reset circuit 20 and the light-emitting control circuit 30 are also illustrated simultaneously.

Figure 5:
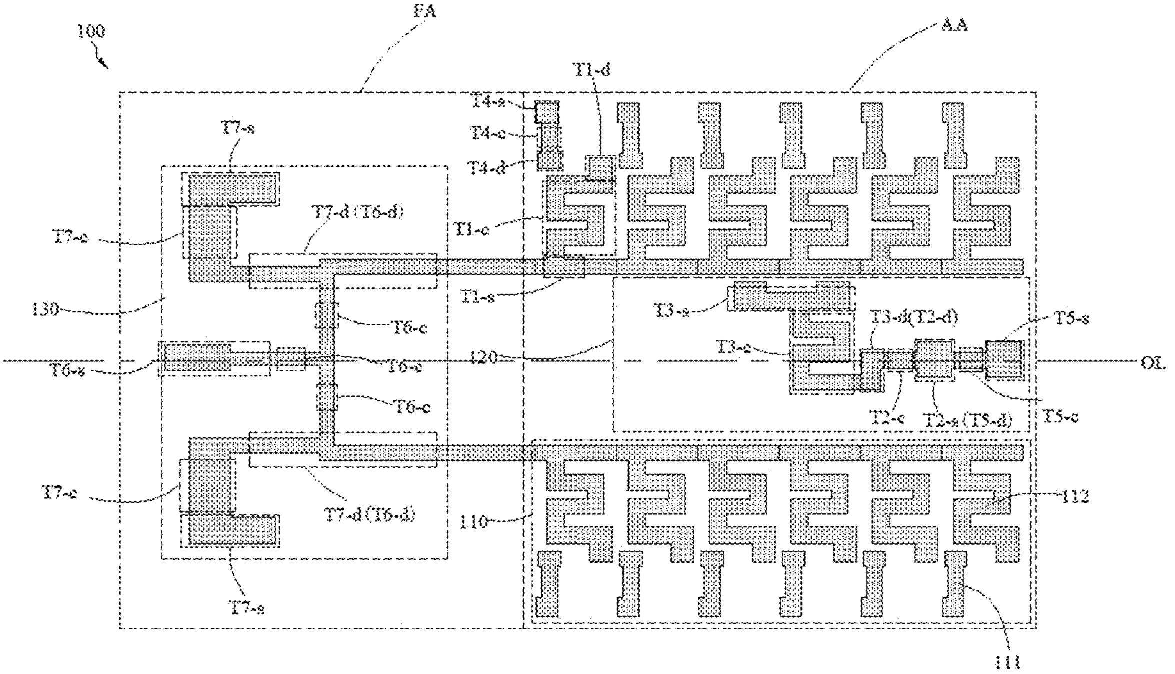
FIG. 5 is a schematic diagram of a planar structure of an active semiconductor layer in an exemplary embodiment of the present disclosure.

As shown in FIG. 5, the array substrate further includes an active semiconductor layer 100 located at a side of the substrate. The active semiconductor layer 100 includes an active layer of at least one pixel group 1. The active semiconductor layer 100 includes a plurality of first semiconductor portion groups 110 and a second semiconductor portion 120 located between any two adjacent ones of the first semiconductor portion groups 110. Specifically, the active semiconductor layer 100 includes the plurality of first semiconductor portion groups 110 arranged along the column direction, and the second semiconductor portion 120 located between any two adjacent ones of the first semiconductor portion groups 110. Orthographic projections, on the substrate, of the first semiconductor portion groups 110 and the second semiconductor portion 120 are located in the display area AA.

In some embodiments, the first semiconductor portion group 110 includes a first semiconductor portion sub-group and a second semiconductor portion sub-group. The first semiconductor portion sub-group is located at a side, along the column direction, of the second semiconductor portion sub-group, and specifically at a side of the second semiconductor portion sub-group away from the second semiconductor portion 120, but is not limited thereto, for example, a side of the second semiconductor portion sub-group close to the second semiconductor portion 120.

The first semiconductor portion sub-group includes a plurality of first semiconductor sub-portions 111, the plurality of first semiconductor sub-portions 111 are arranged along the row direction, and the first semiconductor sub-portion 111 includes an active layer of the fourth transistor T4; the second semiconductor portion sub-group includes a plurality of second semiconductor sub-portions 112, the second semiconductor sub-portions 112 are arranged along the row direction, and the second semiconductor sub-portion 112 includes an active layer of the driving transistor T1.

In an embodiment, the first semiconductor sub-portion 111 may be separated from and disconnected with the second semiconductor sub-portion 112, as shown in FIG. 5. In another embodiment, the first semiconductor sub-portion 111 and the second semiconductor sub-portion 112 may also be connected to form an integrated structure, the specifics of which are not limited in the present disclosure. In addition, the first semiconductor sub-portions 111 and the second semiconductor sub-portions 112 in two adjacent first semiconductor portion groups 110 may be in a mirror-symmetrical distribution. Referring specifically to FIG. 5, the first semiconductor sub-portions 111 and the second semiconductor sub-portions 112 in two adjacent first semiconductor portion groups 110 are symmetrical with respect to an axis OL. The axis OL is a central axis of the pixel group 1 parallel to the row direction.

The first semiconductor sub-portion 111 and the second semiconductor sub-portion 112 may have various shapes. In an embodiment, the first semiconductor sub-portion 111 is substantially in a "1" shape, and the second semiconductor sub-portion 112 is substantially in an "S" shape. In another embodiment, the first semiconductor sub-portion 111 may be in a "T" shape, "S" shape, or other shapes, and the second semiconductor sub-portion 112 may also be in a "1" shape, "T" shape, or other shapes, the specifics of which are not limited in the present disclosure.

The second semiconductor portion 120 includes an active layer of the third transistor T3, an active layer of the second transistor T2, and an active layer of the fifth transistor T5. The active layer of the third transistor T3, the active layer of the second transistor T2, and the active layer of the fifth transistor T5 are sequentially arranged along the row direction.

In an exemplary embodiment of the present disclosure, the active semiconductor layer 100 includes a channel region pattern and a doped region pattern of the transistor, and the doped region refers to a first electrode region and a second electrode region of the transistor. In an embodiment of the present disclosure, channel region patterns and doped region patterns of respective transistors are provided integrally.

It should be noted that in FIG. 5, dashed boxes are used to mark regions in the active semiconductor layer 100 for the first electrode/second electrode regions and the channel regions of respective transistors.

The first semiconductor sub-portion 111 includes, in an order along the column direction, a first electrode region T4-*s*, a channel region T4-*c*, and a second electrode region T4-*d* of the fourth transistor T4. The second semiconductor sub-portion 112 includes, in an order along the column direction, a second electrode region T1-*d*, a channel region T1-*c*, and a first electrode region T1-*s* of the driving transistor T1. The first electrode regions T1-*s* of a plurality of second semiconductor sub-portions 112 arranged along the row direction are connected to form an integrated structure.

It should be noted herein that in FIG. 5, the pixel group 1 includes two rows and six columns of pixel circuits 10, i.e., including 12 pixel circuits 10. The number of the first semiconductor sub-portions 111 and the number of the second semiconductor sub-portions 112 are equal to the number of the pixel circuits 10.

The second semiconductor portion 120 includes, in an order along the row direction, a channel region T3-*c* of the third transistor T3, a channel region T2-*c* of the second transistor T2, and a channel region T5-*c* of the fifth transistor T5. The second semiconductor portion 120 further includes a first electrode region T3-*s* and a second electrode region T3-*d* of the third transistor T3, where the first electrode region T3-*s* is located at a side, along the column direction, of the channel region T3-*c* of the third transistor T3, and the second electrode region T3-*d* is located between the channel region T3-*c* of the third transistor T3 and the channel region T2-*c* of the second transistor T2 along the row direction. The second semiconductor portion 120 further includes a first electrode region T2-*s* and a second electrode region T2-*d* of the second transistor T2, where the second electrode region T3-*d* of the third transistor T3 is used as the second electrode region T2-*d* of the second transistor T2, and the first electrode region T2-*s* of the second transistor T2 is located between the channel region T2-*c* of the second transistor T2 and the channel region T5-*c* of the fifth transistor T5 along the row direction. The second semiconductor portion 120 further includes a first electrode region T5-*s* and a second electrode region T5-*d* of the fifth transistor T5, where the first electrode region T5-*s* of the fifth transistor T5 is located at a side, along the row direction, of the channel region T5-*c* of the fifth transistor T5, and the first electrode region T2-*s* of the second transistor T2 is used as the second electrode region T5-*d* of the fifth transistor T5.

In some embodiments of the present disclosure, the active semiconductor layer 100 further includes a third semiconductor portion 130 whose orthographic projection on the substrate is located in the non-display area FA. specifically, the third semiconductor portion 130 may be located at one or two sides, along the row direction, of the display area AA. Specifically, in an embodiment, the third semiconductor portion 130 is located at two sides of the display area AA, with only one side exemplarily shown in FIG. 5, and the other side may be designed with reference to the structure in FIG. 5. The third semiconductor portion 130 includes an active layer of the sixth transistor T6 and an active layer of the seventh transistor T7. The active layer of the seventh transistor T7 is located at a side, along the row direction, of a row of the first semiconductor portion groups 110, and the active layers of the plurality of seventh transistors T7 are arranged along the column direction. In FIG. 5 only two rows of the first semiconductor portion groups 110, and two active layers of the seventh transistors T7 are shown exemplarily. The active layer of the sixth transistor T6 is located at a side, along the row direction, of the second semiconductor portion 120. Furthermore, the active layer of the sixth transistor T6 may be located between the active layers of two adjacent seventh transistors T7.

In some embodiments of the present disclosure, each row of the pixel circuits 10 in a single pixel group 1 is connected to one sixth transistor T6 and one seventh transistor T7. The active layers of the sixth transistors T6 connected to two adjacent rows of the pixel circuits 10, and the active layers of the seventh transistors T7 connected to two adjacent rows of the pixel circuits 10 are mirror symmetrical with respect to the central axis of the pixel group 1 parallel to the row direction. Referring to FIG. 5, the active layers of the sixth transistors T6 connected to two adjacent rows of the pixel circuits 10 and the active layers of the seventh transistors T7 connected to two adjacent rows of the pixel circuits 10 are mirror symmetrical with respect to the axis OL. That is, the distances between the axis OL and the active layers of the sixth transistors T6 that are connected to two adjacent rows of the pixel circuits 10 are equal, and the distances between the axis OL and the active layers of the seventh transistors T7 that are connected to two adjacent rows of the pixel circuits 10 are equal.

Specifically, the active layer of the seventh transistor T7 includes a first electrode region T7-*s*, a channel region T7-*c*, and a second electrode region T7-*d* of the seventh transistor T7. The first electrode region T7-*s* of the seventh transistor T7 is located at a side, along the column direction, of the channel region T7-*c*, and is specifically located at a side away from the active layer of the sixth transistor T6. The second electrode region T7-*d* of the seventh transistor T7 is substantially located at a side, along the row direction, of the channel region T7-*c*, and is specifically at a side close to the display area AA. The second electrode region T7-*d* of the seventh transistor T7 is used as the second electrode region T6-*d* of the sixth transistor T6, and is further connected to the first electrode region T1-*s* of the driving transistor T1 to form an integrated structure.

The first electrode region T6-*s* of the sixth transistor T6 is located between the channel regions T7-*c* of two adjacent seventh transistors T7 arranged along the column direction, and the channel region T6-*c* of the sixth transistor T6 may be located at a side, along the row direction, of the first electrode region T6-*s* of the sixth transistor T6, such as at a side close to the display area AA, or/and at a side, along the column direction, of the second electrode region T6-*d* of the sixth transistor T6. In some embodiments, the sixth transistor T6 may be a dual-gate transistor, and may have two channel regions T6-*c*.

In an embodiment of the present disclosure, the first electrode region may be a source region, and the second electrode region may be a drain region. The first electrode region and the second electrode region may be regions doped with P-type impurities.

Figure 6:
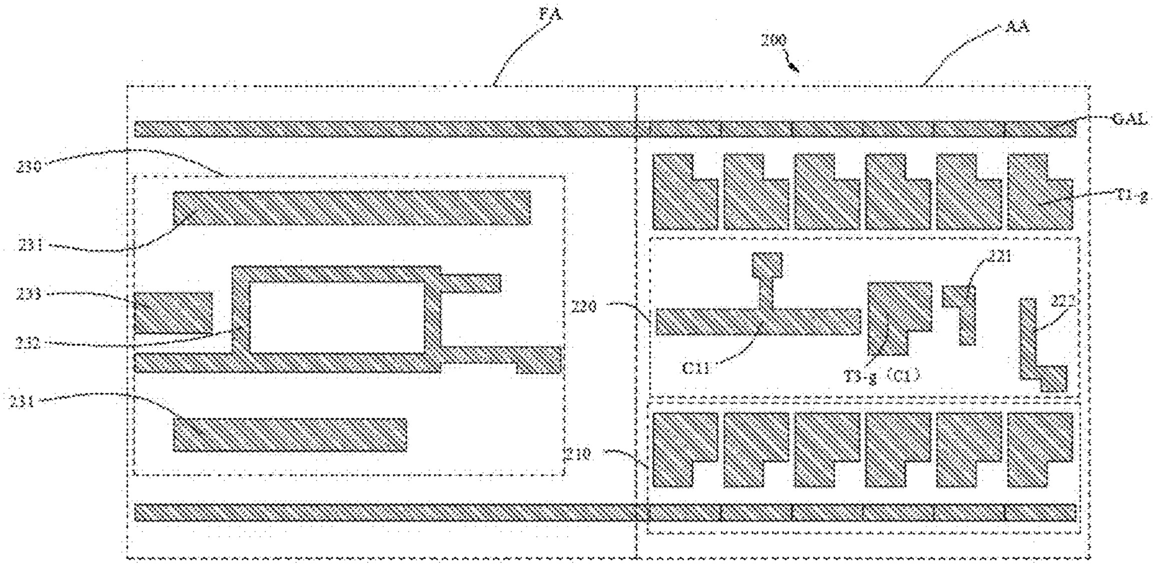
FIG. 6 is a schematic diagram of a planar structure of a first conductive layer in an exemplary embodiment of the present disclosure.
Figure 7:
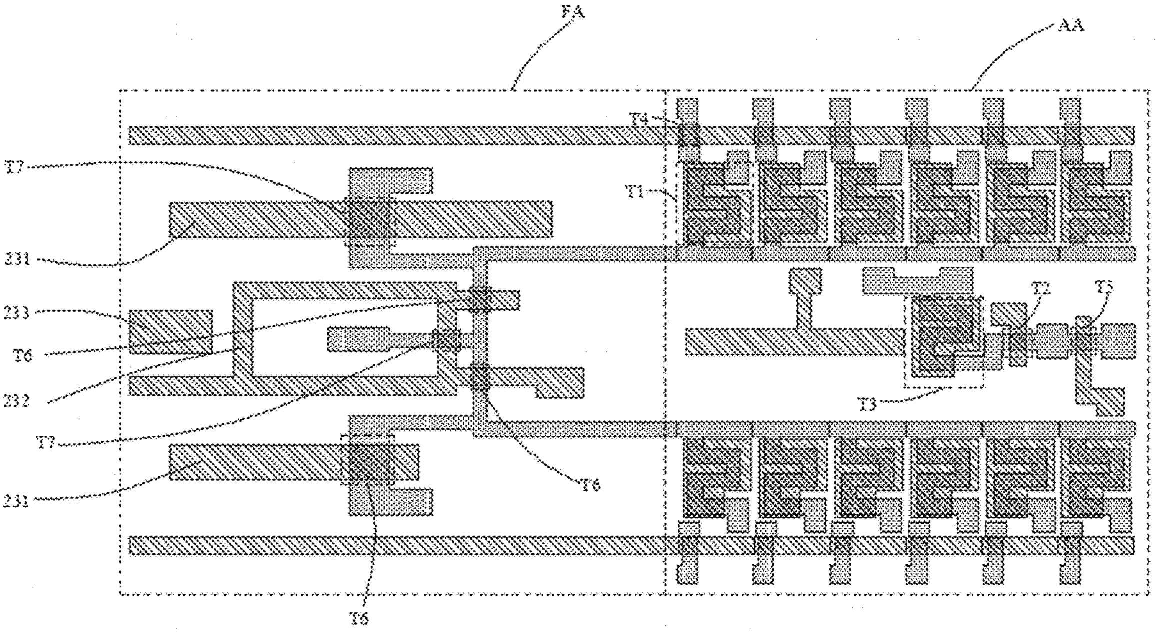
FIG. 7 is a schematic diagram of a stacked structure of an active semiconductor layer and a first conductive layer in an exemplary embodiment of the present disclosure.

As shown in FIGS. 6 and 7, in some embodiments of the present disclosure, the array substrate further includes a first conductive layer 200 located at a side of the active semiconductor layer 100 away from the substrate, where the first conductive layer 200 includes a plurality of first conductive portion groups 210 and a second conductive portion group 220 located between any two adjacent ones of the first conductive portion groups 210. Specifically, the first conductive layer 200 includes the plurality of first conductive portion groups 210 arranged along the column direction, and the second conductive portion group 220 located between any two adjacent ones of the first conductive portion groups 210.

In some embodiments, the first conductive portion group 210 includes a scanning signal line GAL and gates T1-*g* of a plurality of driving transistors T1, and the number of the gates T1-*g* of the driving transistors T1 is equal to the number of the second semiconductor sub-portions 112. The gates T1-*g* of the plurality of driving transistors T1 are arranged along the row direction. Orthographic projections, on the substrate, of the gates T1-*g* of the plurality of driving transistors T1 are at least partially overlapped with orthographic projections of the second semiconductor sub-portions 112 on the substrate. The gate T1-*g* of the driving transistor T1 is used as the first plate C1 of the storage capacitor C. That is, the first conductive layer 200 includes the first plate C1 of the storage capacitor C, and the first plate C1 of the storage capacitor C, and the gate T1-*g* of the driving transistor T1 may be the same structure.

The scanning signal line GAL extends along the row direction and across the display area AA and the non-display area FA. The scanning signal line GAL is located at a side, along the column direction, of the gates T1-*g* of the plurality of driving transistors T1, and may be specifically located at a side of the gates T1-*g* of the plurality of driving transistors T1 away from the second conductive portion group 220, but is not limited thereto. The scanning signal line GAL is connected to the scanning signal end Gate, and is configured to provide the scanning signal to the scanning signal end Gate. The portion, whose orthographic projection on the substrate is overlapped with the orthographic projection of the first semiconductor sub-portion 111 on the substrate, of the scanning signal line GAL is the gate of the fourth transistor T4.

The second conductive portion group 220 includes a first plate C11 of the first capacitor C01. The first plate C11 of the first capacitor C01 has a length in the row direction that is greater than its length in the column direction. In some embodiments, the length, in the row direction, of the first plate C11 of the first capacitor C01 is at least greater than the length, in the row direction, of one pixel circuit, i.e., at least greater than the length, in the row direction, of one sub-pixel of the display panel. For example, the length, in the row direction, of the first plate C11 of the first capacitor C01 may be substantially the length, in the row direction, of two or three or more pixel circuits or sub-pixels.

Furthermore, the second conductive portion group 220 further includes the gate T3-*g* of the third transistor T3, a third conductive sub-portion 221, and a fourth conductive sub-portion 222. Specifically, the second conductive portion group 220 may include the first plate C11 of the first capacitor C01, the gate T3-*g* of the third transistor T3, the third conductive sub-portion 221, and the fourth conductive sub-portion 222 that are arranged along the row direction. It should be noted herein that the first plate C11 of the first capacitor C01, the gate T3-*g* of the third transistor T3, the third conductive sub-portion 221, and the fourth conductive sub-portion 222 are arranged in a manner that the present disclosure does not impose a special limitation, and the specifics may be set according to actual needs. The portion, whose orthographic projection on the substrate is overlapped with the orthographic projection of the second semiconductor portion 120 on the substrate, of the third conductive sub-portion 221 is the gate of the second transistor T2; and the portion, whose orthographic projection on the substrate is overlapped with the orthographic projection of the second semiconductor portion 120 on the substrate, of the fourth conductive sub-portion 222 is the gate of the fifth transistor T5.

In some embodiments, the gate pattern of the driving transistor T1 is the same as the gate pattern of the third transistor T3; and the overlapped portion between the active layer and the gate of the driving transistor T1 is of the same pattern as the overlapped portion between the active layer and the gate of the third transistor T3, so as to make the threshold voltage of the third transistor T3 and the threshold voltage of the driving transistor T1 equal. It should be noted herein that, due to process errors, the gate pattern of the driving transistor T1 being the same as the gate pattern of the third transistor T3, and the overlapped portion between the active layer and the gate of the driving transistor T1 being of the same pattern as the overlapped portion between the active layer and the gate of the third transistor T3 refer to being the same within the range of process errors, and not being the same in an absolute sense. Similarly, the threshold voltages of the third transistor T3 and the driving transistor T1 are subject to a certain error, and therefore, in the present disclosure, the threshold voltage of the third transistor T3 and the threshold voltage of the driving transistor T1 being equal refers to being substantially equal, and not being equal in an absolute sense.

In some embodiments of the present disclosure, the first conductive layer 200 further includes an eighth conductive portion group 230, and an orthographic projection of the eighth conductive portion group 230 on the substrate is located in the non-display area FA. The eighth conductive portion group 230 is located between two adjacent rows of scanning signal lines GAL. The eighth conductive portion group 230 includes a plurality of conductive portions 231 arranged along the column direction, and a conductive portion 232 located between adjacent ones of the conductive portions 231. A region where the conductive portion 231 is overlapped with the active layer of the seventh transistor T7 is the gate of the seventh transistor T7, and a region where the conductive portion 232 is overlapped with the active layer of the sixth transistor T6 is the gate of the sixth transistor T6.

In some embodiments of the present disclosure, an insulating layer, such as a first gate insulating layer, is further provided between the active semiconductor layer 100 and the first conductive layer 200.

As shown in FIG. 8, FIG. 9, FIG. 15, and FIG. 16, in some embodiments of the present disclosure, the array substrate further includes a second conductive layer 300 located at a side of the first conductive layer 200 away from the substrate. The second conductive layer 300 includes second plates C2 of a plurality of storage capacitors C. The second plates C2 of the plurality of storage capacitors C included in a single pixel group 1 form an integrated structure.

The array substrate further includes a first power supply voltage line VDDL extending along the row direction, where the first power supply voltage line VDDL is connected to the first plate C11 of the first capacitor C01; a second electrode region T2-*d* of the active layer of the second transistor T2 is electrically connected to the second plate C2 of the storage capacitor C, and the second plate C2 of the storage capacitor C is electrically connected to a second plate C12 of the first capacitor C01. Specifically, the second electrode region T2-*d* of the second transistor T2 is electrically connected to the second plate C2 of the storage capacitor C via a first adapter portion; and the second plate C2 of the storage capacitor C is electrically connected to the second plate C12 of the first capacitor C01 via a second adapter portion. In the present disclosure, by connecting the storage capacitor C to one plate of the first capacitor C01 via the second adapter portion, and connecting the other plate of the first capacitor C01 to the first power supply voltage line VDDL, the first power supply voltage line VDDL can provide a constant power supply voltage. This scheme can better regulate the voltage of the third node N3, and prevent the jump generated by the first node N1 in writing data from affecting the third node N3.

The first adapter portion and the second adapter portion are provided in the same layer. In the present disclosure, providing in the same layer refers to being made by using the same material and the same process.

In some embodiments of the present disclosure, the first adapter portion and the second adapter portion extend along the column direction.

The array substrate further includes a reset voltage line VINL extending along the row direction. The reset voltage line VINL and the first power supply voltage line VDDL are provided in the same layer. Orthographic projections, on the substrate, of the reset voltage line VINL and the first power supply voltage line VDDL are located between orthographic projections, on the substrate, of two adjacent rows of the second plates C12 of the storage capacitors C.

An orthographic projection of the first adapter portion on the substrate is at least partially overlapped with the orthographic projections, on the substrate, of the reset voltage line VINL and the first power supply voltage line VDDL; and an orthographic projection of the second adapter portion on the substrate is at least partially overlapped with the orthographic projections, on the substrate, of the reset voltage line VINL and the first power supply voltage line VDDL. In this scheme, the first adapter portion and the second adapter portion are at least partially overlapped with the first power supply voltage line VDDL, which is conducive to playing a certain role in voltage stabilizing for the first adapter portion and the second adapter portion, thereby further enhancing the display effect.

The first adapter portion and the first power supply voltage line VDDL are provided in different layers. That is, the first adapter portion and the second adapter portion are located in the same layer, and the first power supply voltage line VDDL and the reset voltage line VINL are located in another layer.

For example, the array substrate further includes a third conductive layer 400 located at a side of the second conductive layer 300 away from the substrate. The first power supply voltage line VDDL and the reset voltage line VINL are distributed in the second conductive layer 300, and the first adapter portion and the second adapter portion are distributed in the third conductive layer 400. Alternatively, the first adapter portion and the second adapter portion are distributed in the second conductive layer 300, the second adapter portion and the second plate C12 of the first capacitor C01 form an integrated structure, and the first power supply voltage line VDDL and the reset voltage line VINL are distributed in the third conductive layer 400.

The pattern structures of the second conductive layer 300 and the third conductive layer 400 will be described in detail below in connection with different embodiments.

Figure 8:
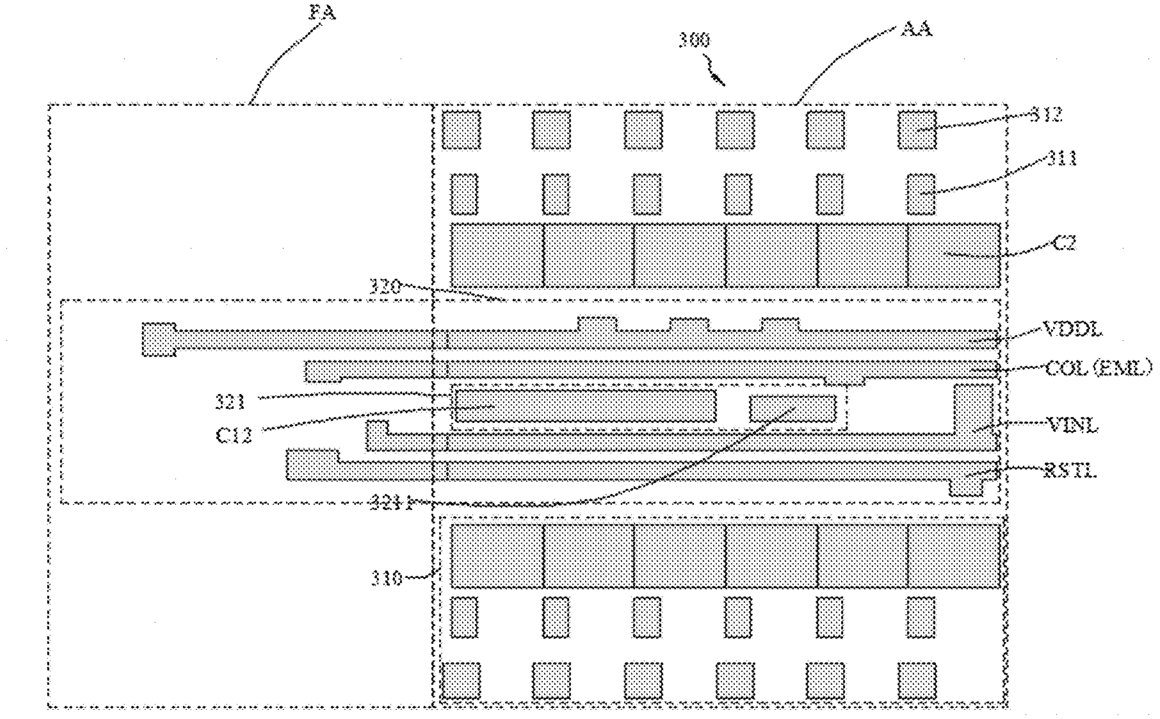
FIG. 8 is a schematic diagram of a planar structure of a second conductive layer in an exemplary embodiment of the present disclosure.
Figure 9:
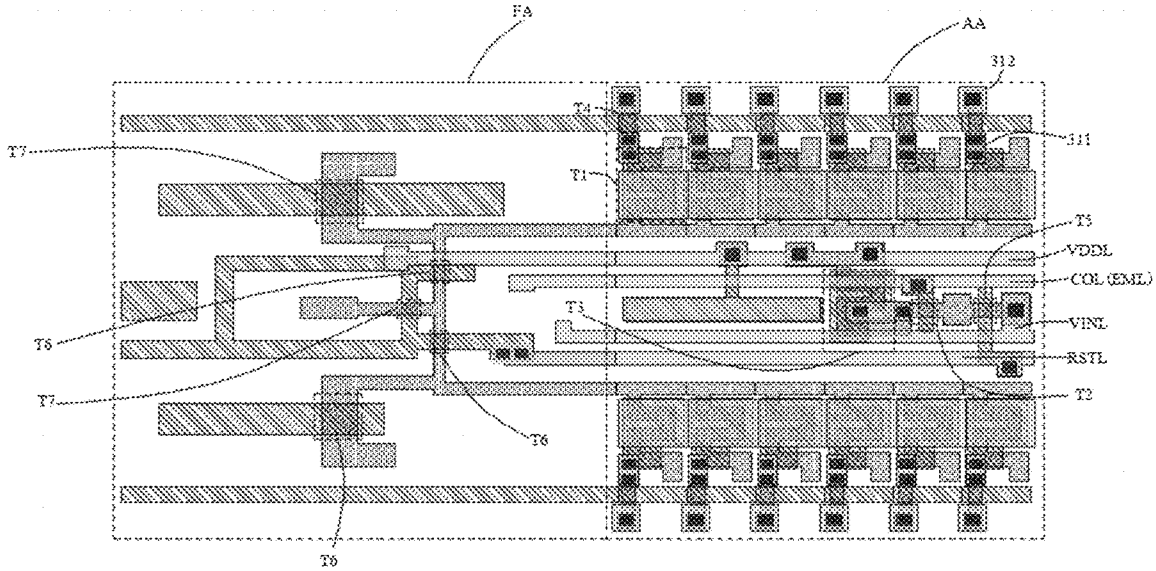
FIG. 9 is a schematic diagram of a stacked structure of an active semiconductor layer, a first conductive layer and a second conductive layer in an exemplary embodiment of the present disclosure.

As shown in FIGS. 8 and 9, in some embodiments, the second conductive layer 300 includes a plurality of third conductive portion groups 310 arranged along the column direction, and a fourth conductive portion group 320 located between any two adjacent ones of the third conductive portion groups 310. Specifically, the second conductive layer 300 includes the plurality of third conductive portion groups 310 arranged along the column direction, and the fourth conductive portion group 320 located between any two adjacent third conductive portion groups 310.

The third conductive portion group 310 includes a first connection portion set and second plates C2 of the plurality of storage capacitors C. The first connection portion set includes a plurality of first connection portions 311, where the plurality of first connection portions 311 are arranged along the row direction. The first connection portion 311 is connected to the gate T1-*g* of the driving transistor T1, and the second electrode region T4-*d* of the active layer of the fourth transistor T4, which may be specifically connected through vias. In FIG. 9, a black block structure indicates a via. The second plates C2 of the plurality of storage capacitors C are located at a side, along the column direction, of the first connection set group, and specifically may be located at a side of the first connection portion set close to the fourth conductive portion group 320.

Figure 17:
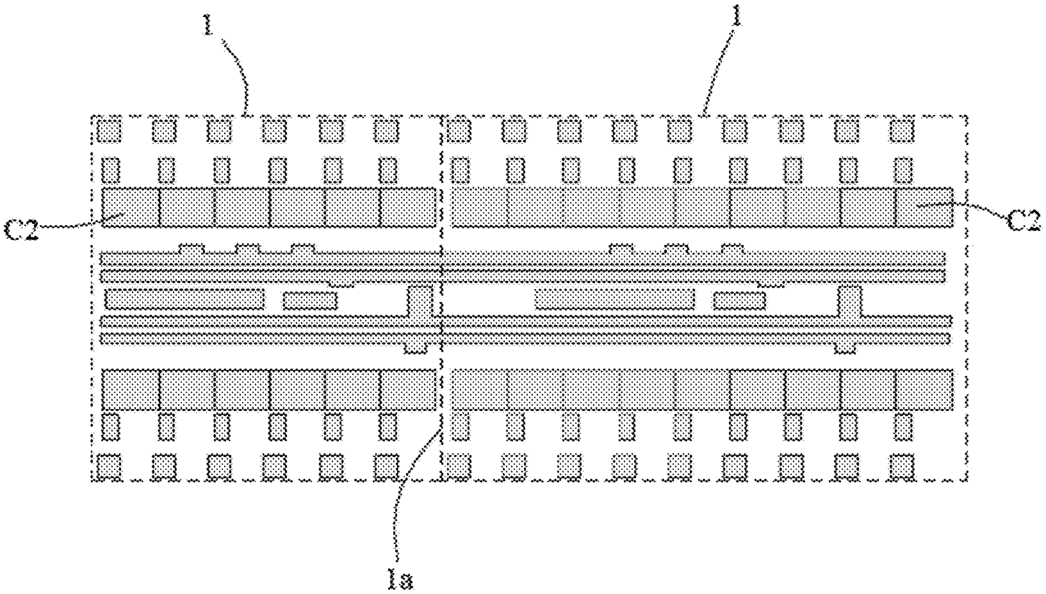
FIG. 17 is a schematic diagram of a planar structure of a second conductive layer of different pixel groups in yet another exemplary embodiment of the present disclosure.

It should be noted herein that, as shown in FIG. 17, the second plates C2 of the plurality of storage capacitors C included in a single pixel group 1 form an integrated structure, and second plates C2 of storage capacitors C in two adjacent pixel groups 1 are separated from each other. The separated position is the separating line 1*a* between the two adjacent pixel groups 1.

The third conductive portion group 310 further includes an eighth connection portion set, where the eighth connection portion set includes a plurality of eighth connection portions 312 arranged along the row direction. The eighth connection portion set is located at a side, along the column direction, of the first connection portion set, and specifically located at a side of the first connection portion set away from the second plate C2 of the storage capacitor C. The eighth connection portion 312 is connected, through a via, to the first electrode region T4-*s*, which is exposed outside the first conductive layer 200, of the active layer of the fourth transistor T4.

The fourth conductive portion group 320 includes the first power supply voltage line VDDL, a compensation switch control signal line COL, a fifth conductive portion sub-group 321, the reset voltage line VINL, and a reset control signal line RSTL. The fifth conductive portion sub-group 321 includes the second plate C12 of the first capacitor C01, and a second connection portion 3211, where the second connection portion 3211 and the second plate C12 of the first capacitor C01 are arranged along the row direction. In some embodiments of the present disclosure, the compensation switch control signal line COL may be used as the light-emitting control signal line EML.

As shown in FIG. 9, the first power supply voltage line VDDL is connected to the first power supply voltage end VDD, and is configured to provide the first power supply voltage to the first power supply voltage end VDD. The first power supply voltage line VDDL is connected, through a via, to the first electrode region T3-*s* of the active layer of the third transistor T3. The first power supply voltage line VDDL is connected, through a via, to the first plate C11 of the first capacitor C01.

The first power supply voltage line VDDL extends to the non-display area FA along the row direction, and the first power supply voltage line VDDL is connected, through a via, to the first electrode region T7-*s* of the active layer of the seventh transistor T7.

The compensation switch control signal line COL is connected to the compensation switch control signal end Com, and is configured to provide the compensation switch control signal to the compensation switch control signal end Com. The compensation switch control signal and the light-emitting control signal are the same signal. The compensation switch control signal line COL is connected, through a via, to the gate of the second transistor T2. The compensation switch control signal line COL is used as the light-emitting control signal line EML, and is connected to the gate of the seventh transistor T7 through a via.

The second connection portion 3211 is connected, through vias, to the gate T3-*g* of the third transistor T3, and the second electrode region T3-*d* of the active layer of the third transistor T3. The second electrode region T3-*d* of the third transistor T3 is used as the second electrode region T2-*d* of the second transistor T2.

The reset voltage line VINL is connected to the first reset voltage end Vref, and is configured to provide the first reset voltage to the first reset voltage end Vref. The reset voltage line VINL is connected, through a via, to the first electrode region T5-*s*, which is exposed outside the first conductive layer 200, of the active layer of the fifth transistor T5. The reset voltage line VINL may also be connected to the second reset voltage end Vinit, and configured to provide the second reset voltage to the second reset voltage end Vinit. The reset voltage line VINL may also be connected, through a via, to the first electrode region T6-*s*, which is exposed outside the first conductive layer 200, of the active layer of the sixth transistor T6.

The reset control signal line RSTL is connected to the first reset control signal end Rst1, and is configured to provide the first reset control signal to the first reset control signal end Rst1. The reset control signal line RSTL is connected to the gate of the fifth transistor T5 through a via. The reset control signal line RSTL may also be connected to the second reset control signal end Rst2, and configured to provide the second reset control signal to the second reset control signal end Rst2. The reset control signal line RSTL is connected to the gate of the sixth transistor T6 through a via.

Furthermore, an insulating layer, such as a second gate insulating layer, is further provided between the second conductive layer 300 and the first conductive layer 200. The second gate insulating layer is provided with vias at certain positions to realize the above-described connections between certain regions of the second conductive layer 300 and the first conductive layer 200 or the active semiconductor layer 100.

Figure 10:
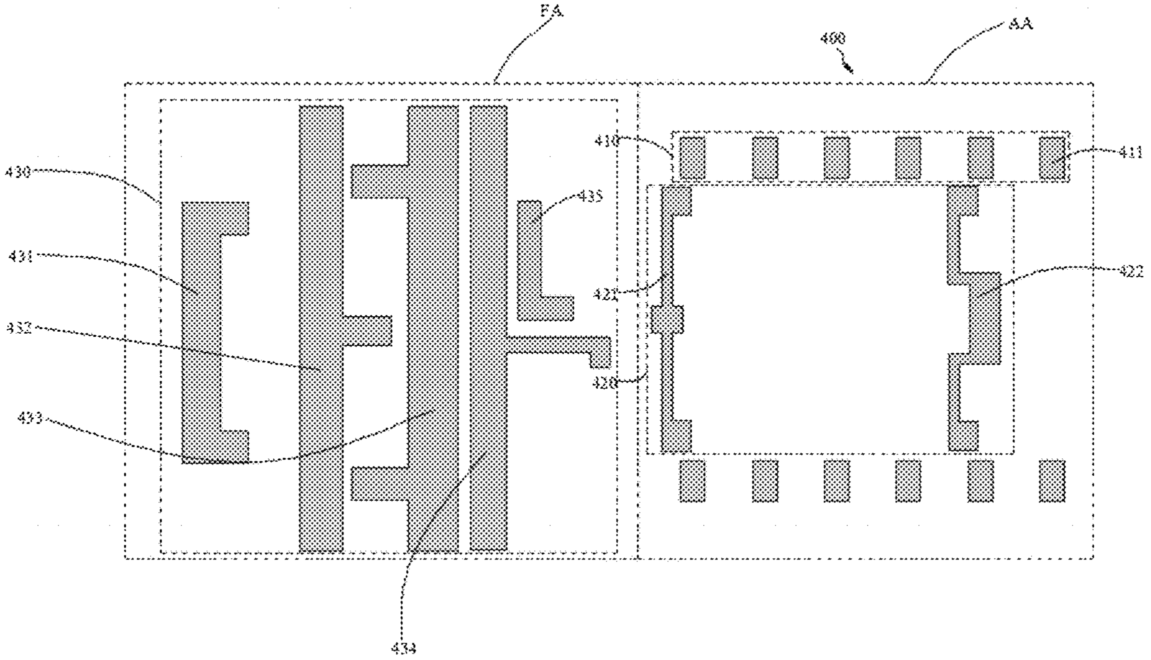
FIG. 10 is a schematic diagram of a planar structure of a third conductive layer in an exemplary embodiment of the present disclosure.
Figure 11:
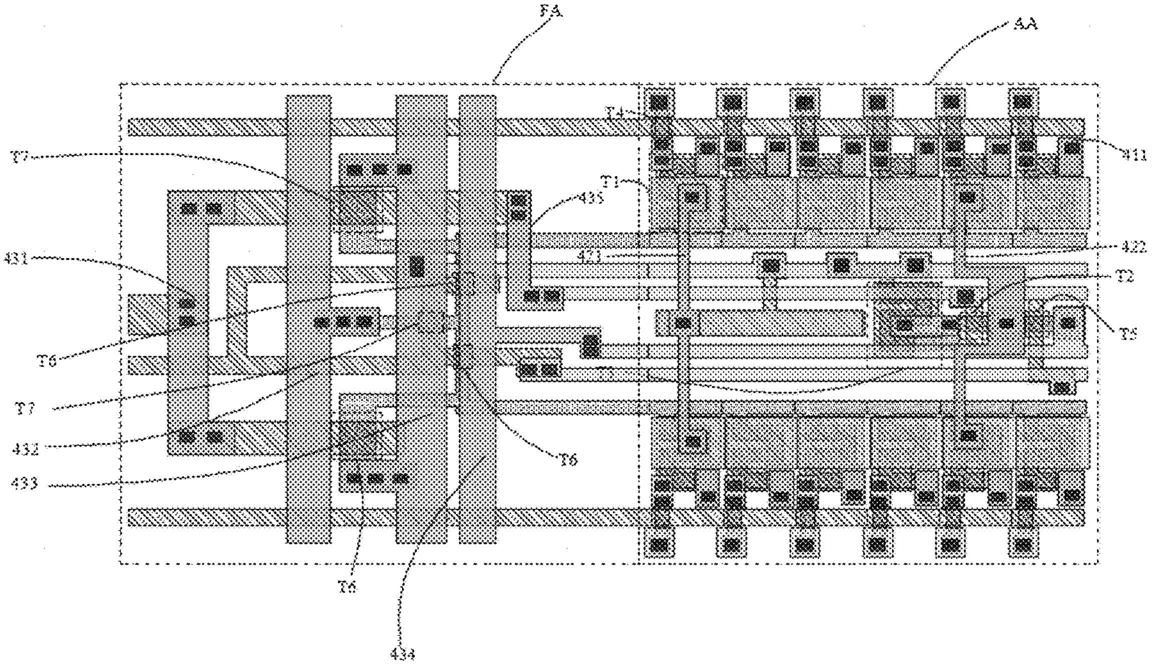
FIG. 11 is a schematic diagram of a stacked structure of an active semiconductor layer, a first conductive layer, a second conductive layer, and a third conductive layer in an exemplary embodiment of the present disclosure.

As shown in FIGS. 10 and 11, the array substrate further includes a third conductive layer 400 located at a side of the second conductive layer 300 away from the substrate. The third conductive layer 400 includes a plurality of fifth conductive portion groups 410 arranged along the column direction, and a sixth conductive portion group 420 located between any two adjacent ones of the fifth conductive portion groups 410. Specifically, the third conductive layer 400 includes the plurality of fifth conductive portion groups 410 arranged along the column direction, and the sixth conductive portion group 420 located between any two adjacent fifth conductive portion groups 410. Orthographic projections, on the substrate, of the fifth conductive portion group 410 and the sixth conductive portion group 420 are located in the display area AA.

In some embodiments, the fifth conductive portion group 410 includes a plurality of fifth conductive portions 411 arranged along the row direction, and the fifth conductive portion 411 is connected, through a via, to the second electrode region T1-*d*, which is exposed outside the first conductive layer 200, of the active layer of the driving transistor T1.

The sixth conductive portion group 420 includes a third connection portion 421 and a fourth connection portion 422 arranged along the row direction. The third connection portion 421 is the second adapter portion, and the fourth connection portion 422 is the first adapter portion. In some embodiments, the third connection portion 421 is connected, through vias, to the second plate C12 of the first capacitor C01, and the second plates C2 of the storage capacitors C of the plurality of third conductive portion groups 310. The second plates C2 of the storage capacitors C of the plurality of third conductive portion groups 310 are all connected to the second plate C12 of the first capacitor C01 through the third connection portion 421. In the modules shown in FIGS. 8 and 11, two third conductive portion groups 310 are included, each third conductive portion group 310 includes a plurality of storage capacitors C, the second plates of the plurality of storage capacitors C form an integrated structure, and the second plates C2 of the storage capacitors C included in two conductive portion groups are all connected to the second plate C12 of the first capacitor C01 through the third connection portion 421.

The fourth connection portion 422 is connected, through a via, to the second electrode region T5-*d* of the active layer of the fifth transistor T5, the second electrode region T5-*d* of the fifth transistor T5 is used as the first electrode region T2-*s* of the second transistor T2, and the fourth connection portion 422 is connected, through vias, to the second plates C2 of the storage capacitors C of the plurality of third conductive portion groups 310. Similarly, the second plates C2 of the storage capacitors C of the plurality of third conductive portion groups 310 are all connected to the second plate C12 of the first capacitor C01 through the fourth connection portion 422.

The third conductive layer 400 further includes a ninth conductive portion group 430, and an orthographic projection of the ninth conductive portion group 430 on the substrate is located in the non-display area FA. The ninth conductive portion group 430 includes a conductive portion 431, a conductive portion 432, a conductive portion 433, a conductive portion 434, and a conductive portion 435 that are sequentially arranged along the row direction. The conductive portion 431 is connected to the gates of different seventh transistors T7, and is connected to a peripheral control circuit. Specifically, the conductive portion 431 may be connected to the peripheral control circuit through the conductive portion 233 distributed in the first conductive layer 200. The conductive portion 432 is connected to the first electrode region T6-*s* of the sixth transistor T6 through a via, and may further be connected to the reset voltage line VINL. The conductive portion 433 is connected to the first electrode region T7-*s* of the seventh transistor T7 through a via, and may further be connected to the first power supply voltage line VDDL. The conductive portion 434 is connected to the reset voltage line VINL through a via, and may further be connected to an output end at the periphery for transmitting the first reset voltage. The conductive portion 435 is connected to the gate of the seventh transistor T7 through a via, and may further be connected to the light-emitting control signal line EML.

An insulating layer, such as an interlayer dielectric layer, is further provided between the second conductive layer 300 and the third conductive layer 400.

Figure 15:
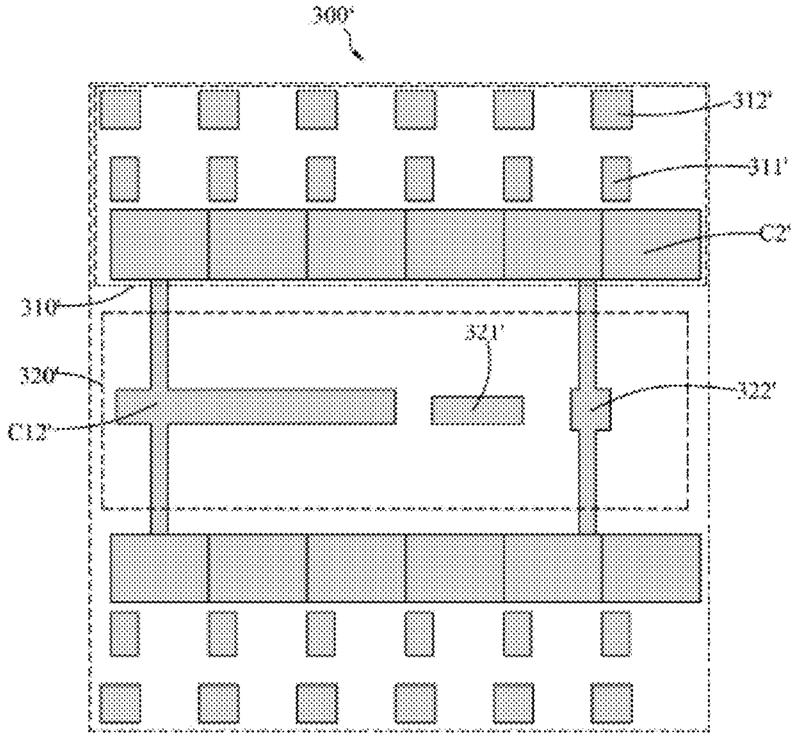
FIG. 15 is a schematic diagram of a planar structure of a second conductive layer in another exemplary embodiment of the present disclosure.
Figure 16:
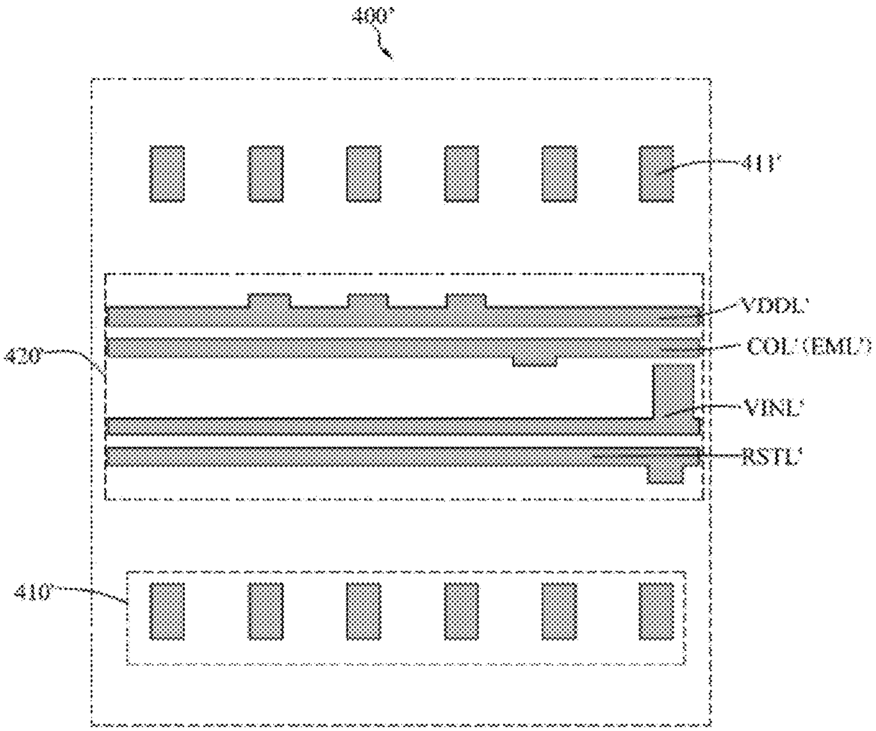
FIG. 16 is a schematic diagram of a planar structure of a third conductive layer in another exemplary embodiment of the present disclosure.

As shown in FIGS. 15 and 16, in other embodiments of the present disclosure, the layouts of the second conductive layer and the third conductive layer included in the array substrate are different from those in the above embodiments.

As shown in FIGS. 15 and 16, in this embodiment, the second conductive layer 300' includes a plurality of third conductive portion groups 310', and a fourth conductive portion group 320' located between any two adjacent ones of the third conductive portion groups 310'. Specifically, the second conductive layer 300' includes the plurality of third conductive portion groups 310' arranged along the column direction, and the fourth conductive portion group 320' located between any two adjacent third conductive portion groups 310'.

The third conductive portion group 310' includes a first connection portion set and second plates C2' of the plurality of storage capacitors C. The first connection portion set includes a plurality of first connection portions 311', and the plurality of first connection portions 311' are arranged along the row direction. The second plates C2' of the plurality of storage capacitors C form an integrated structure. The second plates C2' of the plurality of storage capacitors are located at a side, along the column direction, of the first connection portion set, specifically at a side of the first connection portion set close to the fourth conductive portion group 320'. The first connection portion 311' is connected, through vias, to the gate T1-*g* of the driving transistor T1, and the second electrode region T4-*d* of the active layer of the fourth transistor T4.

The third conductive portion group 310' may further include an eighth connection portion set, where the eighth connection portion set includes a plurality of eighth connection portions 312' arranged along the row direction. The eighth connection portion set is located at a side, along the column direction, of the first connection portion set, specifically at a side of the first connection portion set away from the second plate C2' of the storage capacitor C. The eighth connection portion 312' is connected, through a via, to the first electrode region T4-*s*, which is exposed outside the first conductive layer 200, of the active layer of the fourth transistor T4.

The fourth conductive portion group 320' includes the second plate C12' of the first capacitor C01, a sixth connection portion 321', and a seventh connection portion 322' that are arranged along the row direction. The second plate C12' of the first capacitor C01 is connected to the second plates C2' of the plurality of storage capacitors C to form an integrated structure, and the connection structure between the second plate C12' of the first capacitor C01 and the second plates C2' of the plurality of storage capacitors C is the second adapter portion. The sixth connection portion 321' is connected, through vias, to the gate T3-*g* of the third transistor T3, and the second electrode region T3-*d* of the active layer of the third transistor T3. The second electrode region T3-*d* of the third transistor is used as the second electrode region T2-*d* of the second transistor T2.

The seventh connection portion 322' is connected to the second plates C2' of the plurality of storage capacitors to form an integrated structure, and the seventh connection portion 322' is connected, through a via, to the second electrode region T5-*d* of the active layer of the fifth transistor T5. The second electrode region T5-*d* of the fifth transistor T5 is used as the first electrode region T2-*s* of the second transistor T2. The seventh connection portion 322' is the first adapter portion.

The third conductive layer 400' includes a plurality of fifth conductive portion groups 410' arranged along the column direction, and a sixth conductive portion group 420' located between any two adjacent ones of the fifth conductive portion groups 410'.

In some embodiments, the fifth conductive portion group 410' includes a plurality of fifth conductive portions 411' arranged along the row direction, and the fifth conductive portion 411' is connected, through a via, to the second electrode region T1-*d*, which is exposed outside the first conductive layer 200, of the active layer of the driving transistor T1.

The sixth conductive portion group 420' includes a first power supply voltage line VDDL', a compensation switch control signal line COL', a reset voltage line VINIL', and a reset control signal line RSTL' that are arranged along the column direction.

The first power supply voltage line VDDL' is connected to the first power supply voltage end VDD, and is configured to provide the first power supply voltage to the first power supply voltage end VDD. The first power supply voltage line VDDL' is connected, through a via, to the first electrode region T3-*s* of the active layer of the third transistor T3, and the first power supply voltage line VDDL' is connected to the first plate C11 of the first capacitor C01 through a via.

The compensation switch control signal line COL' is connected to the compensation switch control signal end Com, and is configured to provide the compensation switch control signal to the compensation switch control signal end Com. The compensation switch control signal and the light-emitting control signal are the same signal, and the compensation switch control signal line COL' is connected to the gate of the second transistor T2 through a via. The compensation switch control signal line COL' is used as the light-emitting control signal line EML, and is connected to the gate of the seventh transistor T7 through a via.

The reset voltage line VINIL' is connected to the first reset voltage end Vref, and is configured to provide the first reset voltage to the first reset voltage end Vref. The reset voltage line VINIL' is connected, through a via, to the first electrode region T5-*s*, which is exposed outside the first conductive layer 200, of the active layer of the fifth transistor T5. The reset voltage line VINL' may also be connected to the second reset voltage end Vinit, and configured to provide the second reset voltage to the second reset voltage end Vinit. The reset voltage line VINL' may also be connected, through a via, to the first electrode region T6-*s*, which is exposed outside the first conductive layer 200, of the active layer of the sixth transistor T6.

The reset control signal line RSTL' is connected to the first reset control signal end Rst1, and is configured to provide the first reset control signal to the first reset control signal end Rst1. The reset control signal line RSTL' is connected to the gate of the fifth transistor T5 through a via. The reset control signal line RSTL' may also be connected to the second reset control signal end Rst2, and configured to provide the second reset control signal to the second reset control signal end Rst2. The reset control signal line RSTL' is connected to the gate of the sixth transistor T6 through a via.

It should be noted herein that only the pattern structures, in the display area AA, of the second conductive layer 300' and the third conductive layer 400' are shown in FIGS. 15 and 16, and the pattern structures of the two located in the non-display area FA may be improved accordingly with reference to FIGS. 8 and 10, and will not be repeated in detail herein.

Figure 12:
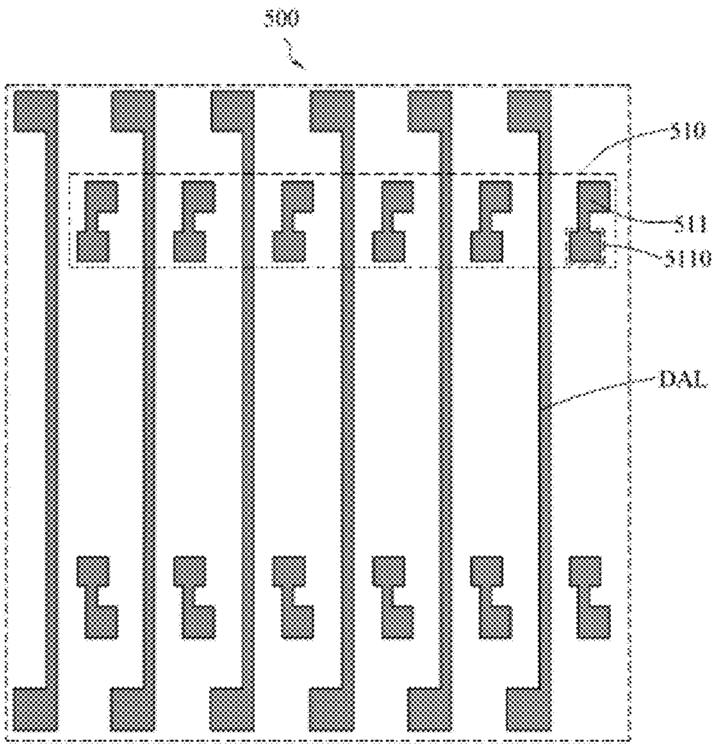
FIG. 12 is a schematic diagram of a planar structure of a fourth conductive layer in an exemplary embodiment of the present disclosure.
Figure 13:
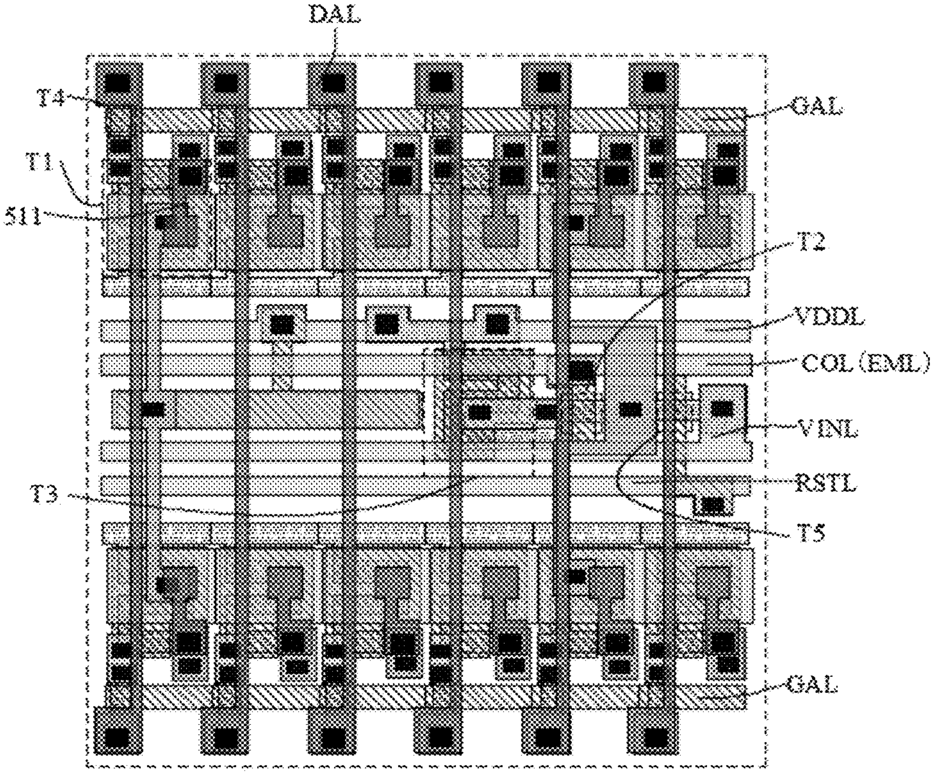
FIG. 13 is a schematic diagram of a stacked structure of an active semiconductor layer, a first conductive layer, a second conductive layer, and a fourth conductive layer in an exemplary embodiment of the present disclosure.

As shown in FIGS. 12 and 13, in some embodiments of the present disclosure, the array substrate further includes a fourth conductive layer 500 located at a side of the third conductive layer 400 away from the substrate. The fourth conductive layer 500 includes a plurality of data signal lines DAL and a plurality of seventh conductive portion groups 510; and the data signal lines DAL extend along the column direction and are arranged along the row direction. The data signal line DAL is connected, through vias, to the first electrode regions T4-*s* of the active layers of a plurality of fourth transistors T4. Specifically, the data signal line DAL may be directly connected to the first electrode region T4-*s* of the active layer of the fourth transistor T4, or may be adapted through the eighth connection portion 312. The seventh conductive portion group 510 includes a plurality of fifth connection portions 511 arranged along the row direction; the fifth connection portion 511 is connected to the fifth conductive portion 411 through a via, so as to subsequently realize the connection between the second electrode region T1-*d* of the driving transistor T1 and the light-emitting device 12 by means of the fifth connection portion 511 and the fifth conductive portion 411.

In some embodiments of the present disclosure, an insulating layer, such as a first planarization layer and/or a first passivation layer, may be further provided between the third conductive layer 400 and the fourth conductive layer 500.

Figure 14:
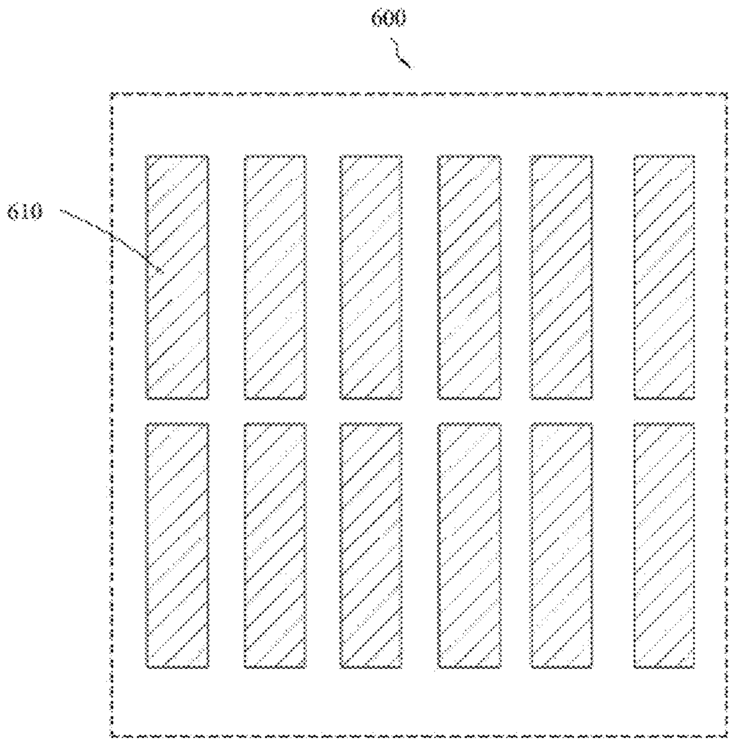
FIG. 14 is a schematic diagram of a planar structure of a fifth conductive layer in an exemplary embodiment of the present disclosure.
Figure 18:
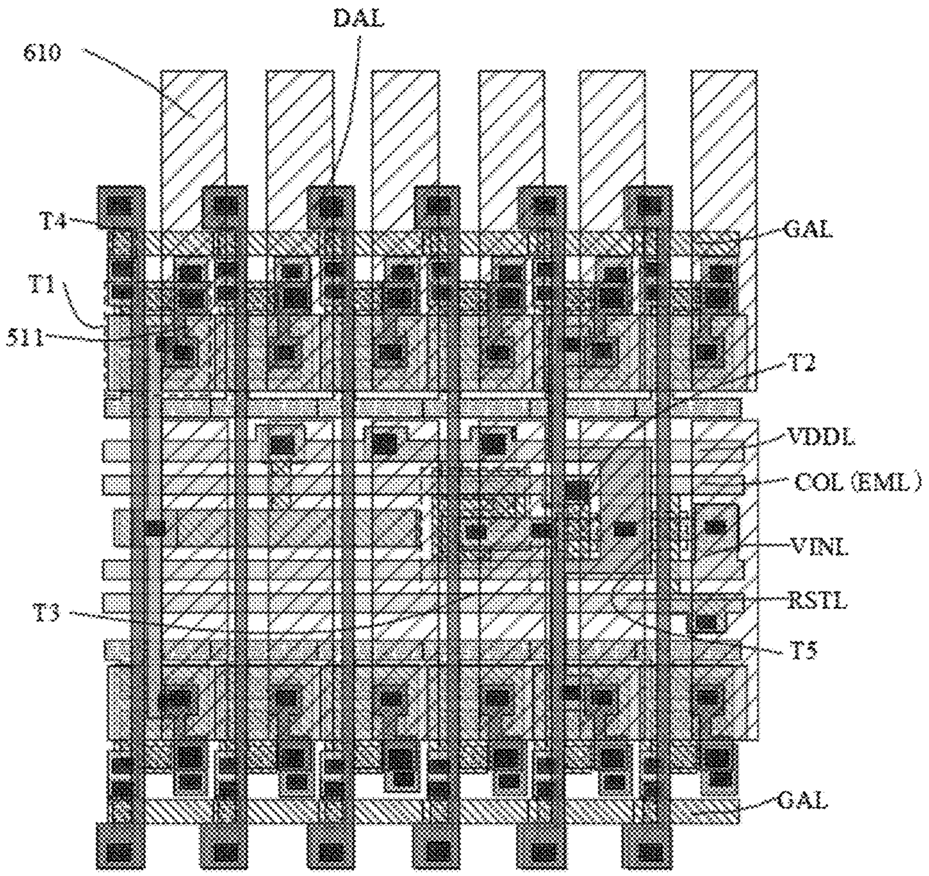
FIG. 18 is a schematic diagram of a stacked structure of an active semiconductor layer, a first conductive layer, a second conductive layer, a fourth conductive layer, and a fifth conductive layer in an exemplary embodiment of the present disclosure.

As shown in FIGS. 14 and 18, in some embodiments of the present disclosure, the array substrate further includes a fifth conductive layer 600 located at a side of the fourth conductive layer 500 away from the substrate. The fifth conductive layer 600 includes a plurality of anodes 610 arranged in an array, and the anode 610 is connected to the fifth connection portion 511 through a via, specifically through a sub-region 5110 of the fifth connection portion 511. Of course, the anode 610 may also be connected to the fifth conductive portion 411 through a via. In this embodiment, the anode 610 of the light-emitting device may be connected to the second electrode region T1-*d* of the driving transistor T1 through the fifth connection portion 511 and the fifth conductive portion 411, or the anode 610 of the light-emitting device may be directly connected to the second electrode region T1-*d* of the driving transistor T1 through the fifth conductive portion 411.

The anode 610 may be a structure of a variety of shapes. Specifically, it may be a rectangle as shown in FIG. 14, or it may be a circle, a hexagon, an octagon, or an irregular shape, etc., the specifics of which are not limited.

The arrangement of the anodes 610 may be set according to the actual arrangement of sub-pixels. In the present disclosure, the sub-pixels may be arranged in RGB, RGBG, GGRB, etc., where R indicates a red sub-pixel, G indicates a green sub-pixel, and B indicates a blue sub-pixel. Specifically in an embodiment, an RGB arrangement is used, where a red sub-pixel, a green sub-pixel and a blue sub-pixel form a pixel unit, and this method is conducive to achieving a higher resolution.

An orthographic projection of the anode 610 on the substrate is at least partially overlapped with an orthographic projection, on the substrate, of the first plate C11 or the second plate C12 of the first capacitor C01. A pixel unit includes three sub-pixels, i.e., including three anodes 610. Lengths, in the row direction, of these three anodes 610 are substantially equal to the length, in the row direction, of the first plate C11 or the second plate C12 of the first capacitor C01. That is, the length of one pixel unit in the row direction is substantially equal to the length, in the row direction, of the first plate C11 or the second plate C12 of the first capacitor C01.

In some embodiments, the orthographic projection of the anode 610 on the substrate is at least partially overlapped with an orthographic projection, on the substrate, of the first plate C1 or the second plate C2 of the storage capacitor C.

Furthermore, a length, in the row direction, of the anode 610 is substantially equal to a length, in the row direction, of the first plate of the storage capacitor C. An orthographic projection, on the substrate, of a portion of the anodes 610 is at least partially overlapped with the orthographic projection of the third transistor T3 on the substrate.

In some embodiments of the present disclosure, an insulating layer, such as a second planarization layer, is further provided between the fourth conductive layer 500 and the fifth conductive layer 600.

It is noted herein that the pattern structures of the film layers after the third conductive layer 400 in the present disclosure differ significantly only in the display area AA, and thus the fourth conductive layer 500 and the fifth conductive layer 600 only show pattern structures located in the display area AA.

In some embodiments of the present disclosure, the array substrate further includes a pixel defining layer, a light-emitting layer and a cathode. The pixel defining layer may be provided with a plurality of openings, and each of the openings defines a range of a light-emitting device. The anode 610 is located in the opening, the light-emitting layer is located at a side of the anode 610 away from the substrate, the cathode is located at a side of the light-emitting layer away from the substrate, and the anode, the light-emitting layer and the cathode form the light-emitting device.

It should be noted herein that when the layouts of the second conductive layer and the third conductive layer of the array substrate are changed, the layouts of the fourth conductive layer and the fifth conductive layer may be adjusted accordingly in order to satisfy the correct connection relationship.

The present disclosure also provides a display panel, and the display panel may further include other components, such as a timing controller, a signal decoding circuit, a voltage conversion circuit, and the like. These components can use existing conventional components, and will not be described in detail herein.

For example, the display panel may be a rectangular panel, a circular panel, an elliptical panel, or a polygonal panel, and the like. In addition, the display panel may be not only a flat panel, but also a curved panel or even a spherical panel. For example, the display panel may also have a touch control function, i.e., the display panel may be a touch control display panel.

The embodiments of the present disclosure also provide a display device that includes the display panel according to any of the embodiments of the present disclosure. The display device may be a mobile phone, a tablet computer, a television, a monitor, a laptop computer, a digital photo frame, a navigator, or any other product or component having a display function.

It should be understood that the present disclosure does not limit its application to the detailed structure and arrangement of the components presented in this specification. The present disclosure is capable of being provided with other embodiments and being implemented and performed in a variety of ways. The foregoing deformed and modified forms fall within the scope of the present disclosure. It should be understood that the present disclosure, as disclosed and limited in this specification, extends to all alternative combinations of two or more individual features mentioned or apparent in the text and/or accompanying drawings. All of these various combinations constitute a plurality of alternative aspects of the present disclosure. The embodiments of this specification illustrate the best ways known for implementing the present disclosure and will enable those skilled in the art to utilize the present disclosure.

What is claimed is:

1. An array substrate, comprising:

a substrate;

an active semiconductor layer, located at a side of the substrate, and comprising an active layer of a plurality of pixel groups, wherein the pixel group comprises a plurality of pixel circuits and a compensation circuit; each of the pixel circuits is connected to the compensation circuit; wherein each of the pixel circuits comprises a driving transistor;

the compensation circuit comprises a third transistor; the compensation circuit is capable of loading a threshold voltage of the third transistor to a control end of the driving transistor;

a channel region of the third transistor has a width to length ratio of a3, a channel region of the driving transistor has a width to length ratio of a1, and a3/a1 is in a range of 1-1.05;

each of the pixel circuits further comprises:

a data writing circuit, connected to a scanning signal end, a data signal end and a first node, and configured to provide, under control of a scanning signal from the scanning signal end, a data signal from the data signal end to the first node; and a storage capacitor, connected to a third node and the first node, and configured to store a voltage difference between the third node and the first node; and the compensation circuit further comprises a voltage regulator circuit connected to a first power supply voltage end and the third node, a first electrode of the third transistor is connected to the first power supply voltage end, the voltage regulator circuit comprises a first capacitor, and the first capacitor is connected to the first power supply voltage end and the third node; and a first conductive layer, located at a side of the active semiconductor layer away from the substrate; wherein the active semiconductor layer comprises a plurality of first semiconductor portion groups and a second semiconductor portion located between any two adjacent ones of the first semiconductor portion groups;

the first semiconductor portion group comprises a plurality of second semiconductor sub-portions, wherein the second semiconductor sub-portion comprises an active layer of the driving transistor;

the second semiconductor portion comprises an active layer of the third transistor; and the first conductive layer comprises a first plate of the storage capacitor and a first plate of the first capacitor, wherein the first plate of the first capacitor has a greater length in a row direction than in a column direction.

2. The array substrate according to claim 1, wherein in the plurality of pixel groups, at least two of the pixel groups comprise different numbers of the pixel circuits;

the pixel group comprises the plurality of pixel circuits arranged in a plurality of rows and columns; and in the plurality of pixel groups, the pixel groups comprise a same number of rows of the pixel circuits, and at least two of the pixel groups comprise different numbers of columns of the pixel circuits;

the array substrate further comprises a plurality of rows of row units, wherein more than one of the pixel groups are arranged along the row direction to form one of the row units; and in the row unit, two adjacent ones of the pixel groups comprise different numbers of columns of the pixel circuits; or the pixel group comprises the plurality of pixel circuits arranged in the plurality of rows and columns, and the compensation circuit is located between any two adjacent rows of the pixel circuits.

3. An array substrate, comprising:

a substrate;

an active semiconductor layer, located at a side of the substrate, and comprising an active layer of at least one pixel group, wherein the pixel group comprises a plurality of pixel circuits and a compensation circuit, each of the pixel circuits is connected to the compensation circuit; each of the pixel circuits comprises a driving transistor, the compensation circuit comprises a third transistor; and the compensation circuit is capable of loading a threshold voltage of the third transistor to a control end of the driving transistor; wherein each of the pixel circuits further comprises:

a data writing circuit, connected to a scanning signal end, a data signal end and a first node, and configured to provide, under control of a scanning signal from the scanning signal end, a data signal from the data signal end to the first node; and a storage capacitor, connected to a third node and the first node, and configured to store a voltage difference between the third node and the first node; and the compensation circuit further comprises a voltage regulator circuit connected to a first power supply voltage end and the third node, a first electrode of the third transistor is connected to the first power supply voltage end, the voltage regulator circuit comprises a first capacitor, and the first capacitor is connected to the first power supply voltage end and the third node; and a first conductive layer, located at a side of the active semiconductor layer away from the substrate; wherein the active semiconductor layer comprises a plurality of first semiconductor portion groups and a second semiconductor portion located between any two adjacent ones of the first semiconductor portion groups;

the first semiconductor portion group comprises a plurality of second semiconductor sub-portions, wherein the second semiconductor sub-portion comprises an active layer of the driving transistor;

the second semiconductor portion comprises an active layer of the third transistor; and the first conductive layer comprises a first plate of the storage capacitor and a first plate of the first capacitor, wherein the first plate of the first capacitor has a greater length in a row direction than in a column direction.

4. The array substrate according to claim 3, wherein the data writing circuit comprises a fourth transistor, a gate of the fourth transistor is connected to the scanning signal end, a first electrode of the fourth transistor is connected to the data signal end, and a second electrode of the fourth transistor is connected to the first node;

the compensation circuit comprises: a second transistor, connected to a compensation switch control signal end, a fourth node and the third node, and configured to conduct the third node and the fourth node under control of a compensation switch control signal from the compensation switch control signal end;

the pixel group further comprises: a first reset circuit, connected to a first reset control signal end, a first reset voltage end and the third node, and configured to reset the third node by providing, under control of a first reset control signal from the first reset control signal end, a first reset voltage from the first reset voltage end to the third node, wherein the first reset circuit comprises a fifth transistor, a gate of the fifth transistor is connected to the first reset control signal end, a first electrode of the fifth transistor is connected to the first reset voltage end, and a second electrode of the fifth transistor is connected to the third node; and the first semiconductor portion group further comprises an active layer of the fourth transistor; the second semiconductor portion further comprises an active layer of the second transistor, and an active layer of the fifth transistor; and the active layer of the third transistor, the active layer of the second transistor, and the active layer of the fifth transistor are sequentially arranged along the row direction.

5. The array substrate according to claim 4, further comprising:

a second conductive layer, located at a side of the first conductive layer away from the substrate, wherein the second conductive layer comprises second plates of a plurality of storage capacitors, and the second plates of the plurality of storage capacitors comprised in a single one of the at least one pixel group form an integrated structure; wherein in two adjacent pixel groups of the at least one pixel group, the second plates of the plurality of storage capacitors comprised in one of the pixel groups are separated from and disconnected with the second plates of the plurality of storage capacitors comprised in another one of the pixel groups.

6. The array substrate according to claim 5, further comprising a first power supply voltage line extending along the row direction; wherein the first power supply voltage line is connected to the first plate of the first capacitor;

a second electrode region of the active layer of the second transistor is electrically connected to the second plate of the storage capacitor, and the second plate of the storage capacitor is electrically connected to a second plate of the first capacitor;

the second electrode region of the second transistor is electrically connected to the second plate of the storage capacitor via a first adapter portion;

the second plate of the storage capacitor is electrically connected to the second plate of the first capacitor via a second adapter portion; and the first adapter portion and the second adapter portion are provided in a same layer.

7. The array substrate according to claim 6, wherein the first adapter portion and the second adapter portion extend along the column direction;

the array substrate further comprises a reset voltage line extending along the row direction, wherein the reset voltage line and the first power supply voltage line are provided in a same layer, and orthographic projections, on the substrate, of the reset voltage line and the first power supply voltage line are located between orthographic projections, on the substrate, of two adjacent rows of the second plates of the storage capacitors;

an orthographic projection of the first adapter portion on the substrate is at least partially overlapped with the orthographic projections, on the substrate, of the reset voltage line and the first power supply voltage line; and an orthographic projection of the second adapter portion on the substrate is at least partially overlapped with the orthographic projections, on the substrate, of the reset voltage line and the first power supply voltage line.

8. The array substrate according to claim 7, wherein the first power supply voltage line and the reset voltage line are distributed in the second conductive layer; and the array substrate further comprises: a third conductive layer, located at a side of the second conductive layer away from the substrate; wherein the first adapter portion and the second adapter portion are distributed in the third conductive layer;

the first adapter portion and the second adapter portion are distributed in the second conductive layer, and the second adapter portion and the second plate of the first capacitor form an integrated structure; and the array substrate further comprises: a third conductive layer, located at a side of the second conductive layer away from the substrate, wherein the first power supply voltage line and the reset voltage line are distributed in the third conductive layer; or the first adapter portion and the first power supply voltage line are provided in different layers.

9. The array substrate according to claim 8, further comprising:

a fourth conductive layer, located at a side of the third conductive layer away from the substrate, wherein the fourth conductive layer comprises a plurality of data signal lines extending along the column direction.

10. The array substrate according to claim 3, wherein the first node is connected to the control end of the driving transistor, and the driving transistor is configured to output, under control of the first node, a driving current to a light-emitting device; the driving transistor is connected to the first node, a second node and a fifth node, and the light-emitting device is connected to the fifth node; the pixel group is connected to a second reset circuit and a light-emitting control circuit; the second reset circuit is connected to a second reset control signal end, a second reset voltage end and the second node, and is configured to reset the second node by providing, under control of a second reset control signal from the second reset control signal end, a second reset voltage from the second reset voltage end to the second node; and the light-emitting control circuit is connected to a light-emitting control signal end, the first power supply voltage end and the second node, and is configured to provide, under control of a light-emitting control signal from the light-emitting control signal end, a first power supply voltage from the first power supply voltage end to the second node;

the second reset circuit comprises a sixth transistor, wherein a gate of the sixth transistor is connected to the second reset control signal end, a first electrode of the sixth transistor is connected to the second reset voltage end, and a second electrode of the sixth transistor is connected to the second node; and the light-emitting control circuit comprises a seventh transistor, wherein a gate of the seventh transistor is connected to the light-emitting control signal end, a first electrode of the seventh transistor is connected to the first power supply voltage end, and a second electrode of the seventh transistor is connected to the second node; and the substrate comprises a display area and a non-display area located at a periphery of the display area; and orthographic projections, on the substrate, of the driving transistor, the second transistor, the third transistor, the fourth transistor, and the fifth transistor are located in the display area; and orthographic projections, on the substrate, of the sixth transistor and the seventh transistor are located in the non-display area.

11. A display panel, comprising the array substrate according to claim 1.

* * * * *